United States Patent
Ljung et al.

(10) Patent No.: US 10,694,504 B2
(45) Date of Patent: Jun. 23, 2020

(54) CO-DEPLOYMENT OF NARROWBAND AND WIDEBAND CARRIERS

(71) Applicant: Sony Mobile Communications Inc., Tokyo (JP)

(72) Inventors: Rickard Ljung, Helsingborg (SE); Peter C. Karlsson, Lund (SE); Basuki Priyanto, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 42 days.

(21) Appl. No.: 16/065,093

(22) PCT Filed: Dec. 22, 2015

(86) PCT No.: PCT/EP2015/081051
§ 371 (c)(1),
(2) Date: Jun. 21, 2018

(87) PCT Pub. No.: WO2017/108111
PCT Pub. Date: Jun. 29, 2017

(65) Prior Publication Data
US 2019/0021081 A1    Jan. 17, 2019

(51) Int. Cl.
*H04W 72/04* (2009.01)
*H04L 5/00* (2006.01)
(Continued)

(52) U.S. Cl.
CPC ....... *H04W 72/0406* (2013.01); *H04L 1/1812* (2013.01); *H04L 5/0044* (2013.01);
(Continued)

(58) Field of Classification Search
CPC ......... H04W 72/0406; H04W 72/0453; H04W 4/70; H04W 16/14; H04L 1/812; H04L 5/0044; H04L 5/0048; H04L 5/0053
See application file for complete search history.

(56) References Cited

U.S. PATENT DOCUMENTS 6,490,314 B1 * 12/2002 Khayrallah ............ H04B 1/707
375/131
8,654,718 B2 * 2/2014 Kwak ................... H04L 5/0007
370/329
(Continued)

FOREIGN PATENT DOCUMENTS

WO      2014155199 A2    10/2014
WO   WO-2014155199 A2 * 10/2014

OTHER PUBLICATIONS

Huawei et al., "Multiple NB-IoT carrier deployment", 3GPP Draft, R1-156923, vol. RAN WG1, Anaheim, USA, Nov. 15, 2015 (Year: 2015).*

(Continued)

*Primary Examiner* — Afsar M Qureshi
(74) *Attorney, Agent, or Firm* — Tucker Ellis LLP

(57) ABSTRACT

Communication is implemented between at least one access node of a wireless network and a terminal attached to the wireless network. The communication is on at least one narrowband carrier (311-1, 311-2) comprising resources (308) in a first spectrum (301) and operating according to a first radio access technology, e.g., Narrowband Internet of Things, NB-IoT. The first spectrum (301) is arranged at least partly within a second spectrum (302) on which communication between the at least one access node and a second terminal is executed on a wideband carrier (312). The wideband carrier (312) comprises resources (308) in the second spectrum (302) and operates according to a second radio access technology different to the first radio access (Continued)

technology, e.g., Machine-Type Communication, MTC, or evolved UMTS radio access, E-UTRA. In some examples, the first spectrum (301) and the second spectrum (302) both may comprise a shared spectrum.

20 Claims, 9 Drawing Sheets

(51) Int. Cl.
  *H04W 4/70* (2018.01)
  *H04L 1/18* (2006.01)
  *H04W 16/14* (2009.01)

(52) U.S. Cl.
  CPC .......... *H04L 5/0048* (2013.01); *H04L 5/0053* (2013.01); *H04W 4/70* (2018.02); *H04W 16/14* (2013.01); *H04W 72/0453* (2013.01)

(56) References Cited

U.S. PATENT DOCUMENTS

| | | | | |
|---|---|---|---|---|
| 2004/0102172 | A1* | 5/2004 | Hendin | H04B 1/005 455/302 |
| 2007/0076813 | A1* | 4/2007 | Haartsen | H04B 1/1036 375/285 |
| 2014/0241261 | A1* | 8/2014 | Ratasuk | H04W 72/0453 370/329 |
| 2015/0029651 | A1 | 1/2015 | Homer et al. | |
| 2015/0296514 | A1* | 10/2015 | Morioka | H04L 5/0044 370/329 |
| 2016/0191285 | A1* | 6/2016 | Eapen | H04L 27/22 375/340 |
| 2018/0234219 | A1* | 8/2018 | Sridharan | H04W 72/0453 |
| 2018/0317231 | A1* | 11/2018 | Wang | H04W 48/16 |

OTHER PUBLICATIONS

International Search Report and Written Opinion from corresponding International Application No. PCT/EP2015/081051, dated Aug. 16, 2016; 14 pages.

Huawei, et al: "Multiple NB-IoT carrier deployment", 3GPP Draft; R1-156923, vol. RAN WG1, Anaheim, USA, Nov. 15, 2015.

Chmiel, M. et al: "Downlink carrier aggregation," LTE Advanced: 3GPP Solution for IMT-Advanced, First Edition, Aug. 1, 2012; 5 pages.

3GPP Technical Report 36.888 V12.0.0, "Study on provision of low-cost Machine-Type Communications (MTC) User Equipments (UUEs) based on LTE," Jun. 2013; 55 pages.

3GPP TSG RAN Meeting #69, RP-151621, "New Work Item: NarrowBand IOT (NB-IOT)," Sep. 14-15, 2015; 9 pages.

3GPP Technical Report 36.300 V12.7.0, "Evolved Universal Terrestrial Radio Access (E-UTRA) and Evolved Universal Terrestrial Radio Access Network (E-UTRAN)," Sep. 2015.

Office Action from corresponding European Application No. 15 816 796.5 dated Jun. 5, 2019.

* cited by examiner

CO-DEPLOYMENT OF NARROWBAND AND WIDEBAND CARRIERS

TECHNICAL FIELD

Various embodiments relate to communicating, between at least one access node of a wireless network and a first terminal, on at least one narrowband carrier comprising resources in a first spectrum and operating according to a first radio access technology. In particular, various embodiments relate to scenarios where the first spectrum is arranged at least partly within a second spectrum on which communication between the at least one access node and a second terminal is executed on a wideband carrier.

BACKGROUND

Mobile communication by means of cellular networks is an integral part of modern life. One example of cellular networks is the Third Generation Partnership Project (3GPP) Long Term Evolution (LTE) technology. The conventional LTE technology employs a radio access technology (RAT) referred to as: evolved Universal Mobile Telecommunications System (UMTS) Terrestrial Radio Access (E-UTRA). E-UTRA RAT employs a bandwidth of 1.4-20 MHz.

Within the 3GPP framework, further RATs are being investigated which aim at meeting target criteria such as: low cost, low complexity, low power consumption.

One RAT investigated is Machine Type Communication (MTC). MTC is a variation of 3GPP LTE communication and employs a reduced bandwidth of 1.4 MHz. The data rate is limited up to 1 MBps. For example: See 3GPP Technical Report (TR) 36.888 V12.0.0 (June 2013). MTC RAT may be based on E-UTRA RAT.

A further RAT investigated is Narrow Band Internet of Things (NB-IoT). Development targets refer to a bandwidth of 180 kHz and a data rate of approximately 100 kbps. See 3GPP RP-151621 "New Work Item: NarrowBand IOT (NB-IOT)". As can be seen, NB-IoT employs a narrowband carrier if compared to, both, LTE and MTC. NB-IoT RAT may be based on E-UTRA RAT.

Techniques of communicating according to the NB-IoT RAT face certain restrictions and drawbacks. E.g., within existing frameworks of NB-IoT, the data rate is fixed to a comparably low value. Further, the data rate is statically fixed and dynamic adaptation of the data rate is not possible or only possible to a limited degree.

SUMMARY

Therefore, and need exists for advanced techniques of communicating according to the NB-IoT RAT. In particular, a need exists for techniques which add flexibility regarding the data rate of communicating according to the NB-IoT RAT.

This need is met by the features of the independent claims. The dependent claims define embodiments.

According to various embodiments, a method is provided. The method comprises communicating on a plurality of narrowband carriers. Said communicating is between at least one access node of a wireless network and a first terminal attached to the wireless network. The plurality of narrowband carriers comprise resources in a first spectrum. The plurality of narrowband carriers operate according to a first RAT. The first spectrum is arranged at least partly within a second spectrum. On the second spectrum, communication between the at least one access node and the second terminal is executed on a wideband carrier. The wideband carrier comprises resources in the second spectrum. The wideband carrier operates according to a second RAT. The second RAT is different to the first RAT.

According to various embodiments, a computer program product is provided. The computer program product comprises program code to be executed by at least one processor. Executing the program code causes the at least one processor to perform a method. The method comprises communicating on a plurality of narrowband carriers. Said communicating is between at least one access node of a wireless network and a first terminal attached to the wireless network. The plurality of narrowband carriers comprise resources in a first spectrum. The plurality of narrowband carriers operate according to a first RAT. The first spectrum is arranged at least partly within a second spectrum. On the second spectrum, communication between the at least one access node and the second terminal is executed on a wideband carrier. The wideband carrier comprises resources in the second spectrum. The wideband carrier operates according to a second RAT. The second RAT is different to the first RAT.

According to various embodiments, a method is provided. The method comprises communicating on at least one narrowband carrier. Said communicating is between at least one access node of a wireless and a first terminal attached to the wireless network. The at least one narrowband carrier comprises resources in a first spectrum. The at least one narrowband carrier operates according to a first RAT. The first spectrum is arranged at least partly within a second spectrum on which communication between the at least one access node and a second terminal is executed on a wideband carrier. The wideband carrier comprises resources in the second spectrum. The wideband carrier operates according to a second RAT. The second RAT is different to the first RAT. The first spectrum and the second spectrum both comprise a shared spectrum.

According to various embodiments, a computer program product is provided. The computer program product comprises program code to be executed by at least one processor. Executing the program code causes the at least one processor to perform a method. The method comprises communicating on at least one narrowband carrier. Said communicating is between at least one access node of a wireless and a first terminal attached to the wireless network. The at least one narrowband carrier comprises resources in a first spectrum. The at least one narrowband carrier operates according to a first RAT. The first spectrum is arranged at least partly within a second spectrum on which communication between the at least one access node and a second terminal is executed on a wideband carrier. The wideband carrier comprises resources in the second spectrum. The wideband carrier operates according to a second RAT. The second RAT is different to the first RAT. The first spectrum and the second spectrum both comprise a shared spectrum.

According to various embodiments, an access node of a wireless network is provided. The access node comprises an interface configured to wirelessly transceive on a radio link. The access node further comprises at least one processor configured to communicate, via the interface, with a terminal. The terminal is attached to the wireless network. Said communicating is on a plurality of narrowband carriers. The plurality of narrowband carriers comprises resources in a first spectrum and operate according to a first RAT. The first spectrum is arranged at least partly within a second spectrum on which communication between the at least one access node and a second terminal is executed on a wideband carrier. The wideband carrier comprises resources in the second spectrum. The wideband carrier operates according to the second RAT. The second RAT is different to the first RAT.

According to various embodiments, an access node of a wireless network is provided. The access node comprises an interface configured to wirelessly transceive on a radio link. The access node comprises at least one processor configured to communicate, via the interface, with a terminal. The terminal is attached to the wireless network. Said communicating is on at least one narrowband carrier. The at least one narrowband carrier comprises resources in a first spectrum. The at least one narrowband carrier operates according to a first RAT. The first spectrum is arranged at least partly within a second spectrum. On the second spectrum, communication between the at least one access node and a second terminal is executed on a wideband carrier. The wideband carrier comprises resources in the second spectrum. The wideband carrier operates according to a second RAT. The second RAT is different to the first RAT. The first spectrum and the second spectrum both comprise a shared spectrum.

According to various embodiments, a method is provided. The method comprises communicating on a plurality of narrowband carriers. Said communicating is between at least one access node of a wireless network and a first terminal attached to the wireless network. The plurality of narrowband carriers comprises resources in a first spectrum. The plurality of narrowband carriers operate according to a first RAT. The first spectrum is arranged at least partly within a second spectrum. The method further comprising communicating, between the at least one access node and a second terminal, on a wideband carrier. The wideband carrier comprises resources in the second spectrum. The wideband carrier operates according to a second RAT. The second RAT is different to the first RAT.

According to various embodiments, a method is provided. The method comprises communicating on at least one narrowband carrier. Said communicating is between at least one access node of a wireless network and a first terminal attached to the wireless network. The at least one narrowband carrier comprises resources in a first spectrum. The at least one narrowband carrier operates according to a first RAT. The first spectrum is arranged at least partly within the second spectrum. The method further comprises communicating between the at least one access node and a second terminal on a wideband carrier. The wideband carrier comprises resources in the second spectrum. The wideband carrier operates according to a second RAT. The second RAT is different to the first RAT. The first spectrum and the second spectrum both comprise a shared spectrum.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 6 illustrates resources on a radio link according to various embodiments, wherein FIG. 6 schematically illustrates a scenario where a first spectrum of a plurality of narrowband NB-IoT carriers is arranged partly within a second spectrum of a wideband LTE carrier, wherein FIG. 6 illustrates a mixed in-band/guard-band non-contiguous deployment scenario.

DETAILED DESCRIPTION OF EMBODIMENTS

Figure 1:
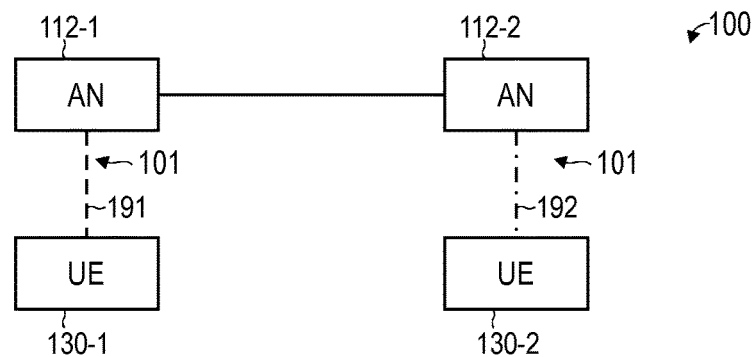
FIG. 1 is a schematic illustration of communicating between a first access node and a first terminal according to a first RAT and of communicating between a second access node and a second terminal according to a second RAT.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of co-deploying communication on at least one narrowband carrier comprising resources in a first spectrum and operating according to a first RAT, on the one hand side, with communication on a wideband carrier comprising resources in a second spectrum and operating to a second RAT, on the other hand side, are disclosed.

Co-deployment can refer to: enabling communication via the first and second RATs in at least overlapping geoareas where interference between the narrowband and wideband carriers exists. Co-deployment can include controlled interference mitigation in order to avoid interference in between communication on the first and second RATs. As such, co-deployment may correspond to communicating via the first and second RATs in a coordinated manner. Central coordination may be applied, e.g., at least during roll-out. E.g., co-deployment may correspond to one or more network operators coordinating deployment of the first and second RATs.

A RAT may correspond to a physical connection technology for communicating on a radio link. As such, a RAT may specify a set of rules enabling communication on a radio link. RATs may specify elements selected from the group comprising: bandwidth of frequency bands of a spectrum associated with a carrier of the RAT; Transmission Time Interval (TTI) duration; modulation and coding scheme (MCS), e.g., turbo code, convolutional coding, interleaving; modulation, e.g., Orthogonal Frequency Division Multiplexing (OFDM), Binary phase-shift keying (BPSK), Gaussian Minimum Shift Keying (GMSK). Different RATs may differ with respect to at least one of such rules.

A RAT may be implemented on a carrier. A carrier specifies a specific set of resources on which communication according to the given RAT can be implemented. As such, each carrier may comprise a certain spectrum and my implement one or more logical channels for communicating on the certain spectrum. Typically, a carrier comprising a spectrum having one or more frequency bands of a relatively large total bandwidth is referred to as a wideband carrier; this is in contrast to carriers comprising a spectrum having one or more frequency bands of a relatively small total bandwidth, which are typically referred to as narrowband carriers. Here, narrowband carriers and wideband carriers may be relatively defined with respect to each other for a co-deployment scenario.

The first and second spectra of the narrowband and wideband carriers, respectively, may both comprise one or more frequency bands. The frequency bands of the spectra are not required to be contiguously arranged. In some examples, the first and second spectra may be non-overlapping, i.e., there may be no shared spectrum being comprised by, both, the first and second spectra. In the further examples, the first and second spectra may comprise a shared spectrum; the shared spectrum may define an overlap in frequency domain.

In particular, hereinafter, techniques of an in-band scenario of the narrowband carrier with respect to the wideband carrier are disclosed. In-band arrangement can correspond to: the first spectrum being arranged at least partly within the second spectrum. E.g., in an in-band deployment scenario, one or more frequency bands of the first spectrum may be arranged adjacently—e.g., without guard bands—to one or more frequency bands of the second spectrum.

In this context, hereinafter, examples are disclosed which enable to flexibly tailor the resource allocation to the at least one narrowband carrier and to the wideband carrier, respectively. E.g., in scenarios where communication on the at least one narrowband carrier is in need for a higher data rate, additional resources may be allocated to the at least one narrowband carrier; here, it is possible that the additional resources for the at least one narrowband carrier are taken away from the wideband carrier.

In a first example, communication can be implemented on a plurality of narrowband carriers. The communication on the plurality of narrowband carriers may be implemented in some scenarios by means of narrowband carrier aggregation (CA). CA can correspond to implementing separated or largely separated lower edges of physical layers of respective communication protocol stacks of the first RAT for each one of the plurality of narrowband carriers and bonding the communication protocol stacks at a point above the lower edge physical layer, e.g., at a Medium Access Layer or at an upper sublayer of the physical layer. CA corresponds to communicating to a single terminal via a plurality of carriers. By using a plurality of narrowband carriers, the amount of resources available in the first spectrum is increased; thereby, the data rate for communication according to the first RAT can be increased, as well.

In a second example, both, the first spectrum of the first RAT according to which at least one narrowband carrier operates, as well as the second spectrum of the second RAT according to which a wideband carrier operates, comprise a shared spectrum. Resources within the shared spectrum may be flexibly allocated to either the at least one narrowband carrier or the wideband carrier, e.g., depending on a required data rate of the at least one narrowband carrier, a traffic throughput, etc. As such, central scheduling across the first and second RATs can be implemented. E.g., a scheduling scheme may allocate the resources within the shared spectrum in a time-division multiplexing (TDM) manner between the at least one narrowband carrier and the wideband carrier.

The various examples disclosed herein may find particular application for a co-deployment scenario of NB-IoT with LTE and/or MTC. In particular, while a single carrier of NB-IoT is typically associated with a bandwidth of, e.g., 180 kHz, a single carrier of LTE has a bandwidth in the range of 1.4 MHz-20 MHz. Also, a single carrier of MTC has a bandwidth of, e.g., 1.4 MHz. As such, and NB-IoT carrier can implement a narrowband carrier (narrowband NB-IoT carrier) with respect to the wideband carrier implemented by a LTE carrier (wideband LTE carrier) and/or an MTC carrier (wideband MTC carrier).

Thus, while various scenarios will be explained in the context of the at least one narrowband NB-IoT carrier and the wideband LTE carrier or the wideband MTC carrier, the techniques disclosed herein can be readily applied to other kinds of wideband carriers and/or narrowband carriers. E.g., regarding the wideband carrier, similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EG-PRS), Universal Mobile Telecommunications System (UMTS), and High Speed Packet Access (HSPA), and corresponding architectures of associated cellular networks. E.g., regarding the narrowband carrier, similar techniques can be readily applied to various kinds of other RATs, such as LTE-Machine to Machine (LTE-M).

FIG. 1 schematically illustrates aspects of a co-deployment scenario of a NB-IoT RAT 191 and a E-UTRA RAT 192, i.e., according to the LTE technology. In the example of FIG. 1, a first access node 112-1 communicates on the narrowband NB-IoT carrier implemented on a radio link 101 with a first terminal 130-1 (labeled User Equipment, UE in FIG. 1). The narrowband NB-IoT carrier operates according to the NB-IoT RAT. A second access node 112-2 communicates on a wideband LTE carrier implemented on the radio link 101 with the second terminal 130-2. The wideband LTE carrier operates according to the E-UTRA RAT.

In the example of FIG. 1, the first terminal 130-1 and the second terminal 130-2 are located in a given geographical area such that, in principle, communication on the narrowband NB-IoT carrier can interfere with communication on the wideband LTE carrier. Therefore, in the example of FIG. 1, control signaling is implemented between the first access node 112-1 and the second access node 112-2 facilitating interference mitigation. In some examples, it is also possible that the first access node 112-1 and the second access node 112-2 are co-located and implemented by a single access node. Such a scenario is shown in FIG. 2.

Figure 2:
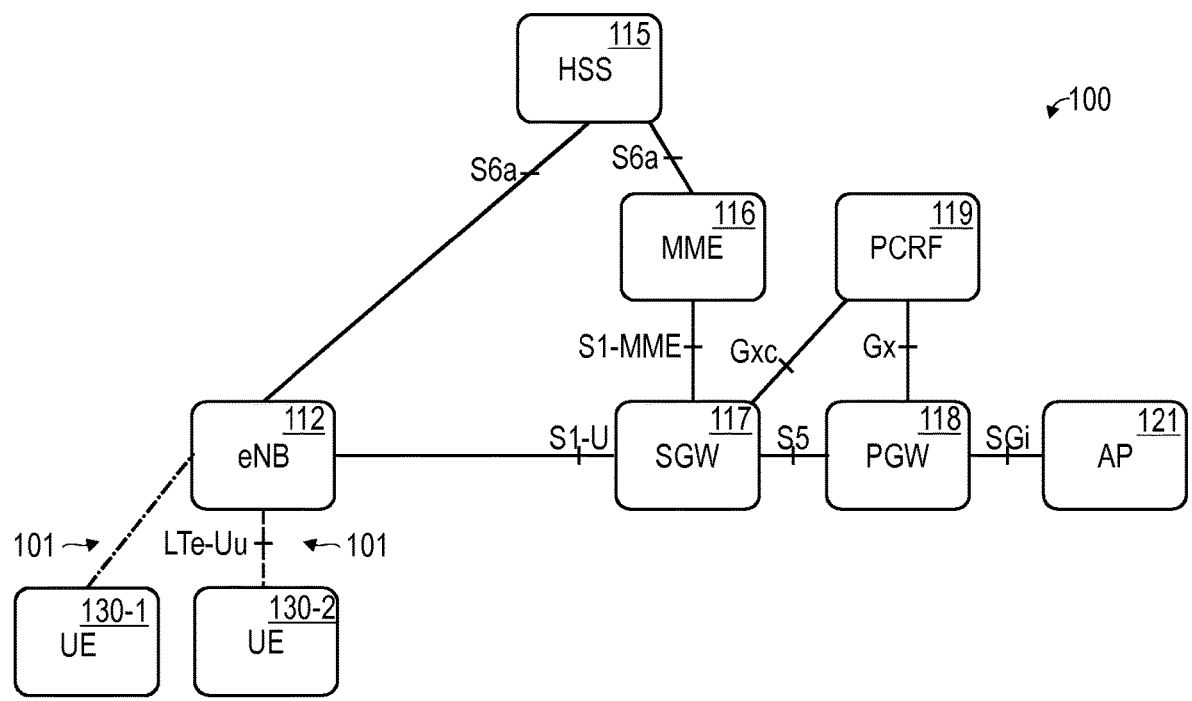
FIG. 2 is a schematic illustration of a cellular network according to the 3GPP LTE and NB-IoT framework, wherein an access node is configured to communicate with a first terminal according to a first RAT and with a second terminal according to a second RAT, wherein the first RAT corresponds to NB-IoT and wherein the second RAT is E-UTRA.

FIG. 2 illustrates the architecture of a cellular network 100 according to some examples implementations. In particular, the cellular network 100 according to the example of FIG. 2 implements the 3GPP LTE architecture, sometimes referred to as evolved packet system (EPS). The EPS is enhanced to support NB-IoT.

The second terminal 130-2 is connected via the radio link 101 to an access node 112 of the cellular network 100. The access node 112 and the terminal 130-2 implement the E-UTRA RAT; therefore, the access point node 112 is an eNB 112. E.g., the second terminal 130-2 may be selected from the group comprising: a smartphone; a cellular phone; a table; a notebook; a computer; a smart TV; etc.

The first terminal 130-1 is connected via the radio link 101 to the eNB 112. However, the first terminal 130-1 and the eNB 112 communicate according to the NB-IoT RAT. E.g., the first terminal 130-1 may be an IoT device.

An IoT device is typically a device with a low requirement on data traffic volumes and loose latency requirements, e.g., if compared to LTE devices or MTC devices. Additionally, communication employing IoT devices should achieve low complexity and low costs. Particularly, the radio frequency (RF) modem should have low complexity. Further, energy consumption of an IoT device should be comparably low in order to allow battery-powered devices to function for a comparably long duration. The battery life should be sufficiently long, e.g., to provide communication capability for up to 10 years.

The eNB 112 is connected with a gateway node implemented by a serving Gateway (SGW) 117. The SGW 117 may route and forward payload data and may act as a mobility anchor during handovers of the terminals 130-1, 130-2.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 2): for this purpose, the PGW 118 is connected with an access point node 121 of the packet data network. The access point node 121 is uniquely identified by an access point name (APN). The APN is used by the terminals 130-1, 130-2 to seek access to the packet data network.

The PGW 118 can be an endpoint of an end-to-end connection (not shown in FIG. 2) for packetized payload data of the terminals 130-1, 130-2. The end-to-end connection may be used for communicating data of a particular service. Different services may use different end-to-end connections or may share, at least partly, a certain end-to-end connection. The end-to-end connection may be implemented by one or more bearers which are used to communicate service-specific data. An EPS bearer which is characterized by a certain set of quality of service parameters indicated by the QoS class identifier (QCI).

Figure 3:
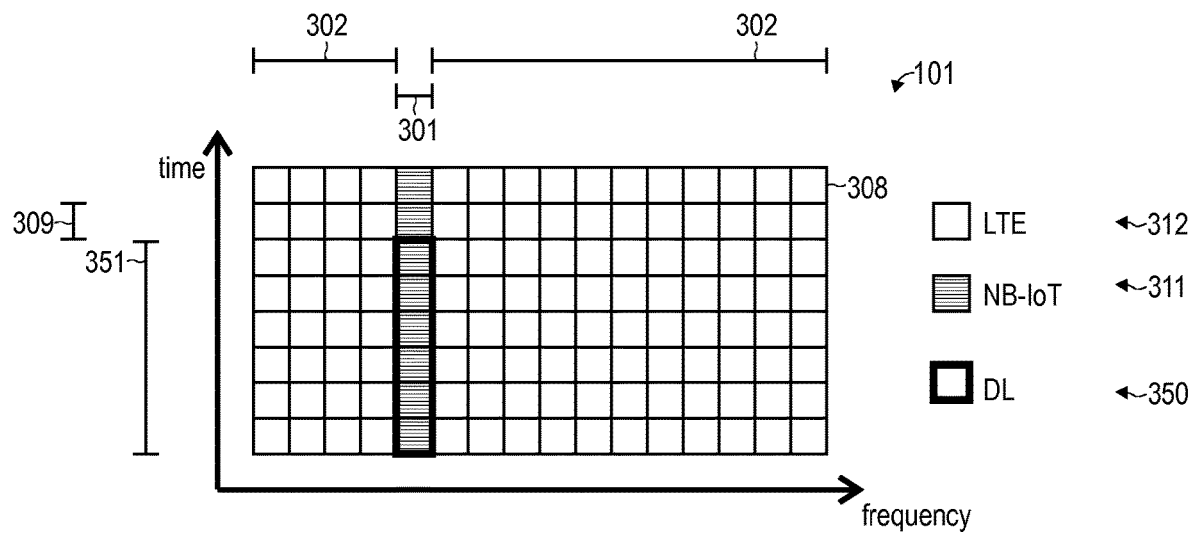
FIG. 3 illustrates resources on a radio link, wherein FIG. 3 schematically illustrates a scenario where a first spectrum of a narrowband NB-IoT carrier is arranged within a second spectrum of a wideband LTE carrier.

FIG. 3 illustrates aspects of communication on the radio link 101 in a co-deployment scenario according to reference implementations. FIG. 3 illustrates the distribution of resources 308 between the wideband LTE carrier 312 and the narrowband NB-IoT carrier 311. FIG. 3 illustrates a time-frequency resource grid.

In FIG. 3, specific resources 308 are highlighted which are identified by a downlink (DL) scheduling assignment for communication of DL payload messages including a data packet 350 between the eNB 112 and the terminal 130-1 according to the NB-IoT RAT 191 (the same graphical denotation is adhered in the following FIGs.).

In the example of FIG. 3, each one of the resources 308 carries the data packet 350 encoded according to a given redundancy version; the data packet 350 is repeatedly transmitted in the example of FIG. 3. In other examples, it would also be possible that—e.g., per HARQ retransmission—only a single repetition of the data packet 350 is transmitted.

While FIG. 3 is illustrated for DL communication of the data packet 350, respective techniques may be readily applied to uplink (UL) scheduling grants, as well. Here, specific resources 308 are identified for UL communication.

Each resource 308 can specify, e.g., a time-frequency resource block via which a certain number of bits can be communicated on the radio link 101. Depending on the MCS, the number of bits per resource 308 can vary. The resources 308 have a well-defined duration in time domain (vertical axis of FIG. 3). The duration of a resource 308 corresponds to the duration of a TTI, sometimes referred to as subframe 309. For a given duration, a certain number of symbols may be subsequently communicated. Likewise, the resources 308 have a well-defined width in frequency domain (horizontal axis of FIG. 3). E.g., the width can amount to 180 kHz. Typically, each resource 308 comprises a plurality of subcarriers onto which symbols are orthogonally modulated.

As can be seen, the wideband LTE carrier 312 comprises resources 308 in a second spectrum 302. The second spectrum 302 comprises two non-contiguously arranged frequency bands. Within the second spectrum 302, resources 308 of a first spectrum 301 of the narrowband NB-IoT carrier 311 are arranged. The first spectrum 301 only comprises a single frequency band in the example of FIG. 3. E.g., the single frequency band of the first spectrum 301 may have a bandwidth of 180 kHz; it may correspond to the frequency width of a single resource 308. The single frequency band of the first spectrum 301 is arranged adjacent to the two frequency bands of the second spectrum 302.

Because the first and second spectra 301, 302 in the example of FIG. 3 are non-overlapping in frequency domain, interference between communicating on the Narrowband NB-IoT carrier 311 and communicating on the wideband LTE carrier 312 is mitigated.

Both, the narrowband NB-IoT carrier 311, as well as the wideband LTE carrier 312 may implement one or more payload channels for communicating payload messages carrying data packets including higher-layer user data, e.g., of a certain application. In particular, the payload channels may facilitate UL communication and DL communication. E.g., for the wideband LTE carrier 312, the DL payload channel is sometimes referred to as Physical Downlink Shared Channel (PDSCH). E.g., for the wideband LTE carrier 312, the UL payload channel is sometimes referred to as Physical Uplink Shared Channel (PUSCH). Similar notations may be employed in some scenarios for the narrowband NB-IoT carrier 311.

Both, the narrowband NB-IoT carrier 311, as well as the wideband LTE carrier 312 may implement one or more control channels for communicating control messages carrying control information for configuring communication according to the respective RAT 191, 192. E.g., for the wideband LTE carrier 312, a specific DL control channel is the Physical Downlink Control Channel (PDCCH) used for communication of scheduling control messages, power control messages, Radio Resource Control (RRC) control signaling, etc. Further examples of control channels include: Physical Control Format Indicator Channel (PCFICH), Physical Hybrid-ARQ Indicator Channel (PHICH) for communicating acknowledgement messages of an Automatic Repeat Request (ARQ) protocol protecting communication of data by controlling retransmissions, and the Physical Broadcast Channel (PBCH). The PBCH can carry system information for terminals requiring to access the network. System information may include the Master Information Block (MIB) control message or the System Information Block (SIB) control message. Similar control channels as disclosed above with respect to the wideband LTE carrier 312 may be implemented for the narrowband NB-IoT carrier 311, as well.

In the example of FIG. 3, the bandwidth of the frequency band of the first spectrum 301 available for communicating messages according to the NB-IoT RAT 191 on the narrowband NB-IoT carrier 311 is limited to 180 kHz. Because of this, the data rate is also limited.

Also, in the example of FIG. 3, the latency of communication is comparably long. This is because a number of four subsequent subframes 309 is required to communicate the data packet 350. In detail, according to the reference implementations as in FIG. 3, a certain number of repeated transmissions of the same redundancy version of encoded data (in the example of FIG. 3, a number of four transmissions of the same redundancy version is employed for communication of the data packet 350). As such, each redundancy version of encoded data within an ARQ protocol is repeated a number of times. Here, it is typically assumed that the repetitions of messages carrying one and the same redundancy version are implemented by a bundled transmission set 351 of messages communicated in consecutive/subsequent subframes 309 of a channel implemented on the radio link, see, e.g., 3GPP Technical Report (TR) 45.820 V13.0.0 (August 2015), Section 6.2.1.3 or 3GPP TR 36.888 V12.0.0 (June 2013). By employing a bundled transmission set 351, a likelihood of successful transmission can be increased even in scenarios of poor conditions of communicating on the radio link. Thereby, the coverage of the cellular network can be significantly enhanced—even for low transmission powers as envisioned within the MTC and NB-IoT domain. This is sometimes referred to as Coverage Enhancement (CE).

Hereinafter, various techniques are disclosed which enable flexible adjustment of the total bandwidth available for communicating according to the NB-IoT RAT 191; thereby, the data rate of communicating according to the NB-IoT RAT 191 can also be flexibly adjusted; it is alternatively or additionally also possible to reduce the transmission latency, e.g., by tailoring transmission of the same redundancy version of data.

The techniques disclosed hereinafter are motivated by the finding that the limited RF modem complexity of the terminal 130-1 implementing an IoT device is not typically determined by its utilized radio bandwidth and peak data rates only or primarily. Several other parameters—especially for the RF subsystem or analog frontend of the RF modem—define the size and cost and, thereby, complexity. As a result of this, some RF modem vendors may re-use design of hardware components for, both, MTC and NB-IoT RF modems, e.g., in order to take benefit of economy of scales. Hence, a NB-IoT RF modem may be hardware capable of utilizing a larger bandwidth and data rates than, e.g., 180 kHz corresponding to a single narrowband NB-IoT carrier (cf. FIG. 3). This motivates increasing the bandwidth available for communication according to the NB-IoT RAT 191, because hardware capability may support such an increased bandwidth.

Figure 4:
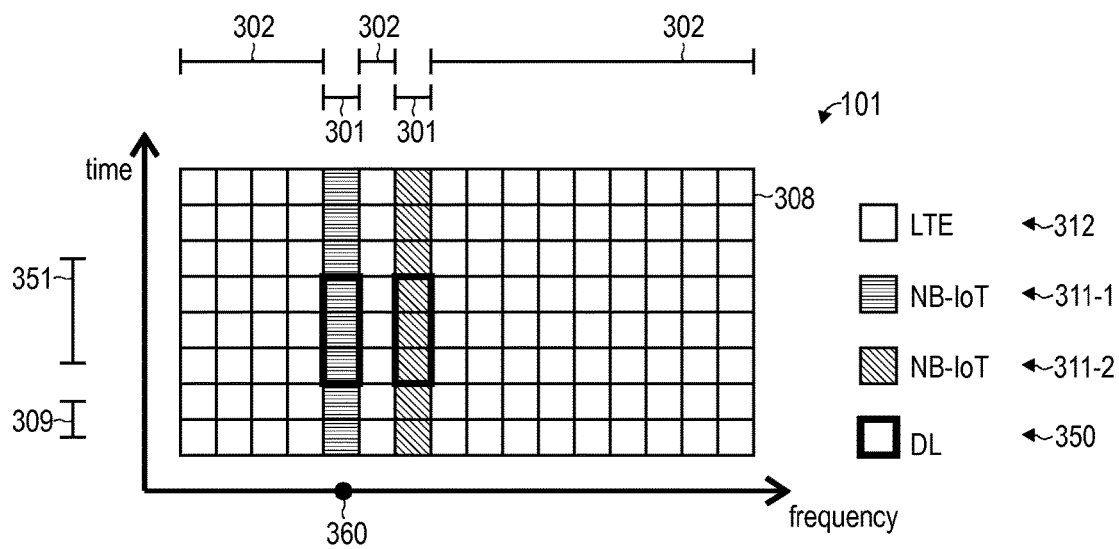
FIG. 4 illustrates resources on a radio link according to various embodiments, wherein FIG. 4 schematically illustrates a scenario where a first spectrum of a plurality of narrowband NB-IoT carriers is arranged within a second spectrum of a wideband LTE carrier, wherein FIG. 4 schematically illustrates an in-band non-contiguous deployment scenario.

FIG. 4 is a first example of a distribution of resources 308 employing a larger total bandwidth for communicating according to the NB-IoT RAT 191. From a comparison of FIGS. 3 and 4, it can be seen that communication according to the NB-IoT RAT 191 in the example of FIG. 4 employs a plurality of narrowband NB-IoT carriers 311-1, 311-2. In the example of FIG. 4, the two narrowband NB-IoT carriers 311-1, 311-2 are arranged in an in-band non-contiguous deployment scenario. The total bandwidth of frequency bands of the first spectrum 301 is doubled. Thereby, the total data rate can also be increased.

Figure 5:
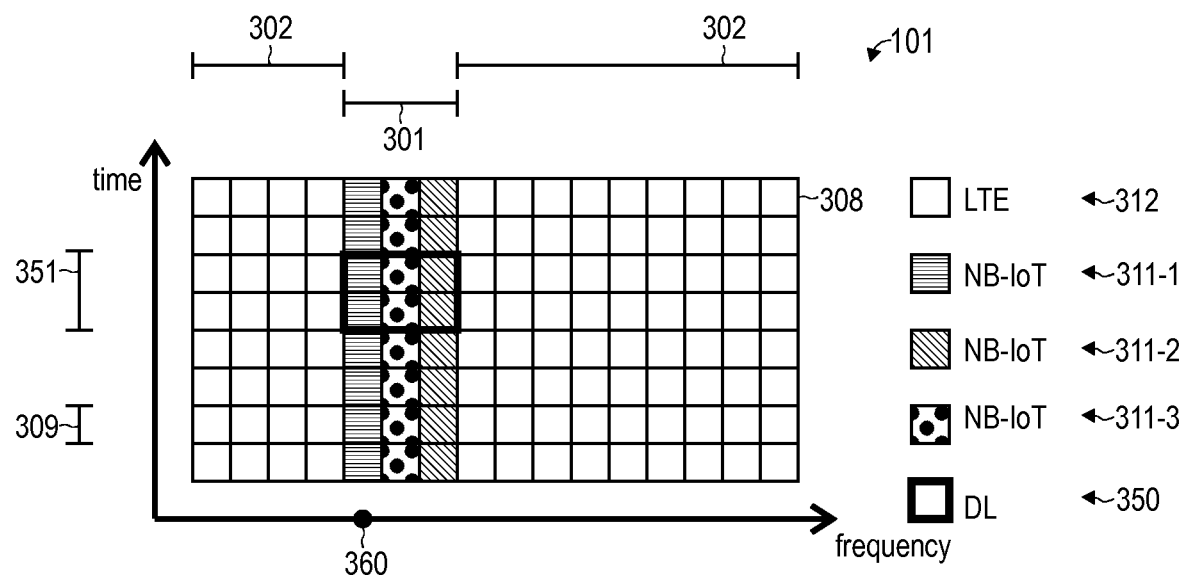
FIG. 5 illustrates resources on a radio link according to various embodiments, wherein FIG. 5 schematically illustrates a scenario where a first spectrum of a plurality of narrowband NB-IoT carriers is arranged within a second spectrum of a wideband LTE carrier, wherein FIG. 5 schematically illustrates an in-band contiguous deployment scenario.

FIG. 5 is a second example of a distribution of resources 308 employing a larger total bandwidth for communicating according to the NB-IoT RAT 191. From a comparison of FIGS. 3 and 5, it can be seen the communication according to the NB-IoT RAT 191 in the example of FIG. 5 employs a plurality of NB-IoT carriers 311-1, 311-2, 311-3. In the example of FIG. 5, the three narrowband NB-IoT carriers 311-1, 311-2, 311-3 are arranged in an in-band contiguous deployment scenario. The total bandwidth of the frequency bands of the first spectrum 301 is tripled. Thereby, the total data rate can also be increased.

Figure 6:
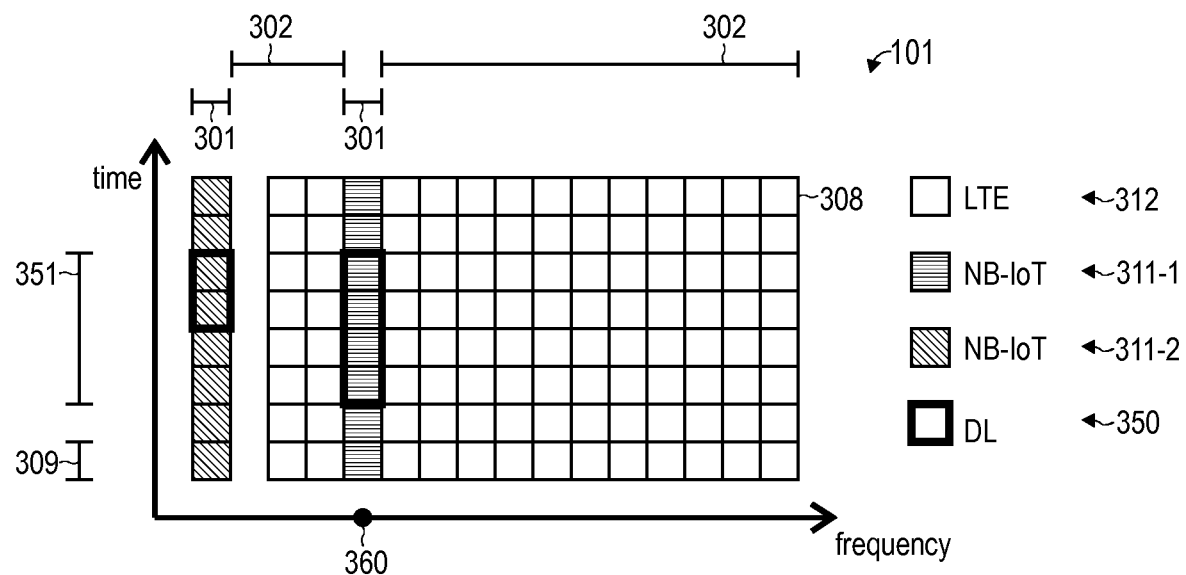

FIG. 6 is a third example of a distribution of resources 308 employing a larger total bandwidth for communicating according to the NB-IoT RAT 191. From a comparison of FIGS. 3 and 6, can be seen that the communication according to the NB-IoT RAT 191 in the example of FIG. 6 employs a plurality of NB-IoT carriers 311-1, 311-2. In the example of FIG. 6, the two narrowband NB-IoT carriers 311-1, 311-2 are arranged in a mixed in-band/guard-band non-contiguous deployment scenario. The total bandwidth of frequency bands of the first spectrum 301 is doubled. Thereby, the total data rate can also be increased.

In the scenarios of FIGS. 4-6, the total bandwidth of the NB-IoT RAT 191 is increased if compared to the reference implementation of FIG. 3. Therefore, it may be desirable to ensure a capability—e.g., a hardware and/or software capability—of the terminal 130-1 to communicate in the extended bandwidth of the added narrowband NB-IoT carriers 311-1, 311-2, 311-3. For this purpose, it is possible that a capability control message is communicated in a control channel of the narrowband NB-IoT carriers 311-1, 311-2, 311-3, the capability control message including an indicator indicating a capability of the first terminal 130-1 to communicate in the first spectrum 301.

Thus, in the scenarios according to FIGS. 4-6, a plurality of narrowband carriers 311-1, 311-2, 311-3 is used and the first spectrum 301 is at least partially arranged within the second spectrum 302. E.g., with reference to FIG. 6, the in-band frequency band of the first spectrum 301 is adjacent to frequency bands of the second spectrum 302 while the guard-band frequency band of the first spectrum 301 is not adjacent to frequency bands of the second spectrum 302.

While in FIGS. 4-6 examples are disclosed where two or three NB-IoT carriers are employed 311-1, 311-2, 311-3, in other examples are larger number of NB-IoT carriers, e.g., four, five, up to ten, etc. NB-IoT carriers may be employed. The specific time-frequency allocation scheme of FIGS. 4-6 is provided only for illustrative purposes. The examples illustrated in FIGS. 4-6 may be combined with each other.

Figure 6A:
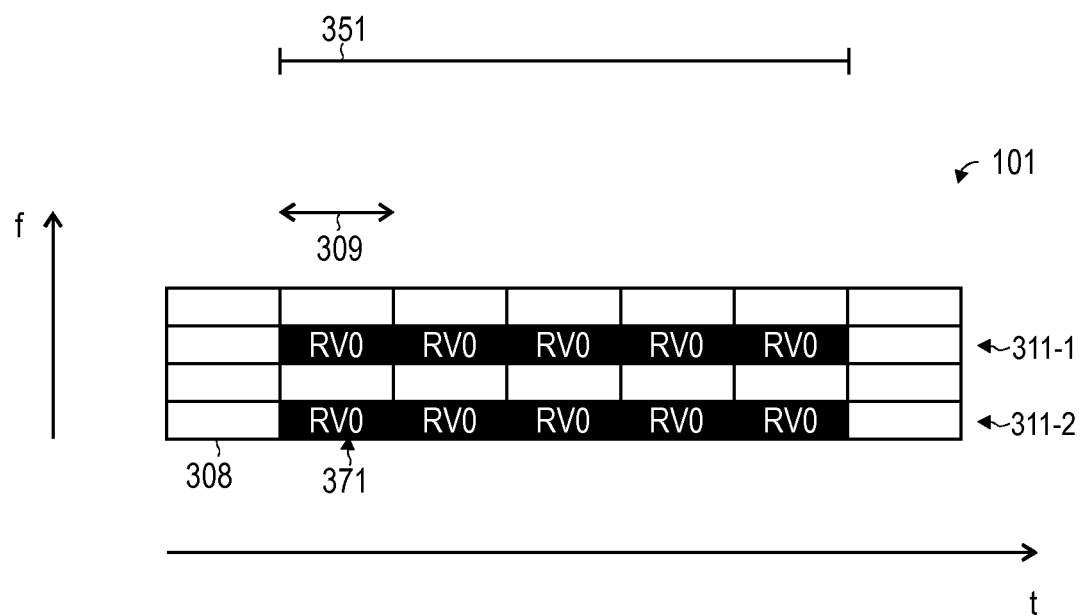
FIG. 6A schematically illustrates a bundled transmission set of messages communicated in subsequent transmission intervals, wherein each one of the messages includes data encoded according to a given redundancy version.

FIG. 6A illustrates aspects of a bundling policy. The bundling policy corresponds to communicating messages including data encoded according to a given redundancy version as a bundled transmission set 351. These techniques may be employed for UL and DL. The bundling policy specifies how the same data packet encoded according to a given redundancy version is communicated using a plurality of repetitions. Applying a bundling policy is optional. While various examples have been disclosed where a bundling policy is applied, the bundling policy is not germane for the techniques disclosed herein, e.g., is not germane for techniques of employing communication on a plurality of different narrowband NB-IoT carriers, e.g., the CA scenario. E.g., it is possible that within each HARQ retransmission only a single repetition of a given redundancy version 371-373 is communicated.

FIG. 6A illustrates payload messages communicated via a payload channel under a bundling policy. The payload messages include a data packet 350 encoded according to a first redundancy version 371 (labeled RV0 in FIG. 6A). As can be seen from FIG. 6A, the messages are contiguously communicated in subsequent subframes 309, thereby implementing the bundled transmission set 351. E.g., the bundled transmission set 351 may comprise a number of more than 20, or more than 50, or more than 100 payload messages, all carrying redundant repetitions of the data packet 350.

The subsequent subframes 309 carrying the data packet 350 are distributed across the different narrowband NB-IoT carriers 311-1, 311-2. In some examples, the temporal arrangement and/or the number of the subframes 309 of a bundled transmission set 351 may be symmetrically distributed across the different narrowband NB-IoT carriers 311-1, 311-2 (as illustrated in FIG. 6A). In further examples, the temporal arrangement and/or the number of the subframes 309 of a bundled transmission set 351 may be asymmetrically distributed across the different narrowband NB-IoT carriers 311-1, 311-2, 311-3 (not illustrated in FIG. 6A).

The specific time-frequency arrangement of the messages as illustrated in FIG. 6A is an example only. Other examples are conceivable.

While in FIG. 6A a scenario is shown where payload messages are communicated, similar techniques may be readily applied to other kinds and types of messages, e.g., control messages.

Figure 6B:
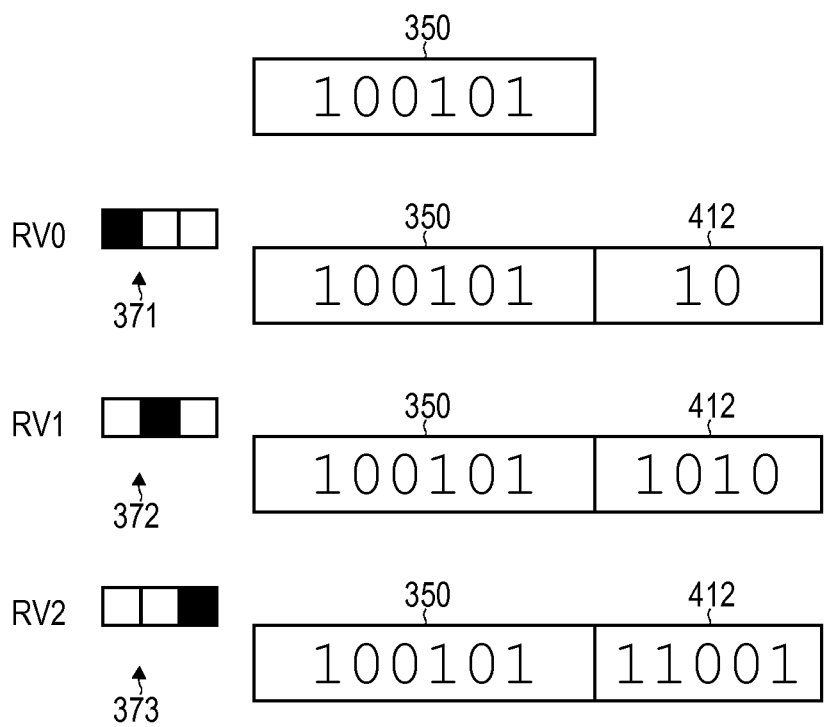
FIG. 6B schematically illustrates messages including data encoded according to different redundancy versions.

FIG. 6B illustrates aspects of encoding a data packet 350 according to different redundancy versions 371-373. As can be seen from FIG. 6B, the data packet 350 comprises a sequence of bits. E.g., the data packet 350 can be at least a part of a MAC layer Service Data Unit (SDU). It would also be possible that the data packet 350 corresponds to a RRC command or other control data such as a ACK, NACK, UL grant, or DL assignment.

Encoding the data packet 350 can correspond to adding a checksum 412 to the data packet 350. Different techniques of encoding can be employed such as, e.g., Reed Solomon encoding, turbo convolutional encoding, convolutional coding, etc. Provisioning the checksum 412 can facilitate reconstruction of corrupted bits of the corresponding message according to the coding scheme. Typically, the longer (shorter) the checksum 412, the more (less) robust the communication of the corresponding message against noise and channel imperfections; thus, a probability for successfully receiving the data packet 350 can be tailored by the length of the checksum. Alternatively or additionally, encoding the data can correspond to applying interleaving where the bits of the data packet 350 are shuffled (not shown in FIG. 6B).

Typically, different redundancy versions 371-373 correspond to checksums 412 of different length (as illustrated in FIG. 6B). In other examples, it would also be possible that different redundancy version 371-373 employ checksums 412 of the same length, but encoded according to the different coding scheme. Alternatively or additionally, different redundancy version may employ different interleaving schemes.

Hereinafter, an example implementation of constructing different redundancy versions is given.

STEP 1 of constructing different redundancy versions: A block of information bits, i.e., the data packet 350 to be transmitted, is encoded. Here, additional redundancy bits are generated, i.e., in addition to the data packet 350. Let N denote the number of information bits; then—e.g., for E-UTRA RAT—the total number of the encoded bits (i.e., the sum of information bits and redundancy bits) may amount to 3N. A decoder that receives all 3N bits typically is able to decode the information bits, even if a large number of bit errors is present in the received bits due to a high BER.

STEP 2 of constructing different redundancy versions: Thus, in order to avoid excessive overhead of transmission, only a fraction of the redundancy bits is selected. The information bits and the selected redundancy bits form the first redundancy version 371. The amount of encoded bits according to the first redundancy version is 371 therefore, using the above example, somewhere between N and 3N. The process of removing redundancy bits by selecting the fraction is sometimes referred to as puncturing. This first redundancy version 371 may then be sent to the receiver.

STEP 3 of constructing different redundancy versions: In case a retransmission is required according to the HARQ protocol, a new redundancy version 372, 373 is sent. The higher order redundancy version 372, 373 includes additional redundancy bits from the ones that were previously punctured in step 2, and typically the same information bits again. In this way, after a couple of repetitions the whole 3N bits have been sent at least once.

It is possible to implement bundled transmission sets 351 using redundant transmissions or repetitions of messages including data encoded according to a given redundancy version 371-373 for payload messages and control messages.

Where a receiver receives the plurality of repetitions of the data packet 350, the decoding can be based on a combination of the received signals of the plurality of repetitions. Thereby, a likelihood of successful decoding can be increased. Implementing the plurality of repetitions can implemented alternatively or additionally to boosting of the transmit power for facilitating successful transmission.

From a comparison of FIGS. 4-6 with FIG. 3, it can be seen that the duration of the bundled transmission set 351 for communicating the given data packet can be greatly reduced. Thus, the latency can be reduced. This is achieved by communicating the same redundancy versions of the data packet 350 on different narrowband NB-IoT carriers 311-1, 311-2, 311-3. I.e., it is possible that first messages including the data packet 350 encoded according to a given redundancy version 371-373 are communicated on a first narrowband NB-IoT carrier 311-1, 311-2, 311-3; while second messages including the data packet 350 encoded according to the same given redundancy version 371-373 are communicated on a second narrowband NB-IoT carrier 311-1, 311-2, 311-3 different from the first narrowband NB-IoT carrier 311-1, 311-2, 311-3. I.e., it is possible that a first plurality of repetitions of the data packet 350 encoded according to a given redundancy version 371, 372, 373 is communicated on the primary carrier 311-1; while a second plurality of repetitions of the data packet encoded according to the same given redundancy version 371, 372, 373 is communicated on the secondary carrier 311-2.

E.g., the first and second plurality of repetitions of the data packet 350 encoded according to the same, given redundancy version 371, 372, 373 may be communicated at least partly in overlapping TTIs, such as the subframes 309. The first and second plurality of repetitions may be communicated at least partly in parallel.

E.g., the number of the first plurality of repetitions may equal the number of the second plurality of repetitions. Also, an asymmetry between the number of the first plurality of repetitions and the number of the second plurality of repetitions may be implemented.

In the examples of FIGS. 4-6, the different redundancy versions of the data packet 350 are communicated across the different narrowband NB-IoT carriers 311-1, 311-2, 311-3 as part of the bundled transmission set 351, e.g., in subsequent subframes 309. In other examples, the plurality of repetitions of the data packet 350 encoded according to the same, given redundancy version 371-373 may be communicated in non-contiguously arranged subframes 309.

In the examples of FIGS. 4-6, 6A, 6B, already an increase in the available data rate can be achieved by increasing the total bandwidth of the first spectrum 301 available for communication according to the NB-IoT RAT 191. Hereinafter, further co-deployment scenarios are disclosed which enable to even further increase the available data rate. The further scenarios enable to further increase the available data rate; this may be achieved by simplifying implementation and reducing control signaling overhead for a given available total bandwidth of the first spectrum 301. The further scenarios are based on an asymmetric distribution of at least one of control messages and control signals and transmit power between the plurality of narrowband carriers 311-1, 311-2, 311-3.

Figure 7:
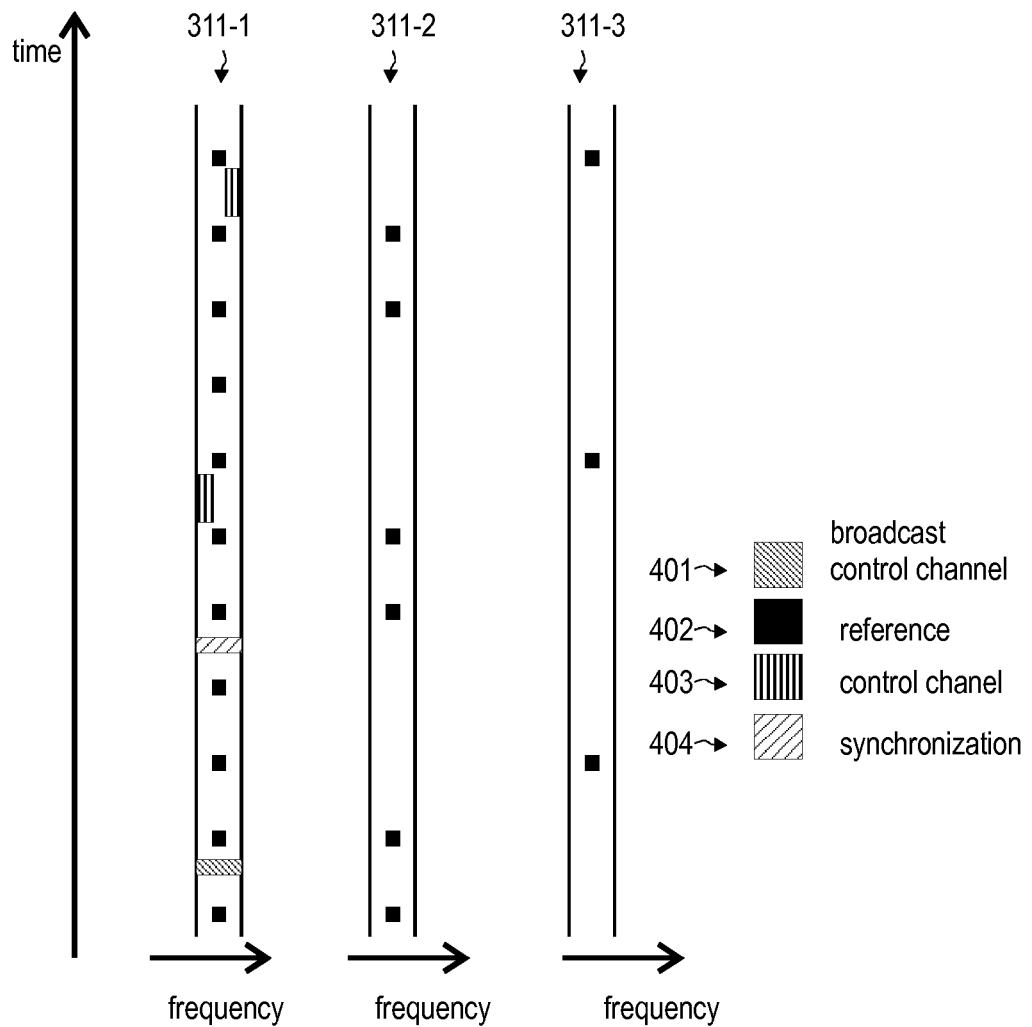
FIG. 7 schematically illustrates an asymmetric distribution of control messages and control signals between the plurality of narrowband NB-IoT carriers according to various embodiments.

FIG. 7 illustrates aspects of asymmetrically distributing control messages and control signals between the plurality of narrowband carriers 311-1, 311-2, 311-3. While, with respect to FIG. 7, the concept of asymmetrically distributing control messages and control signaling is illustrated for an example relying on three narrowband carriers 311-1, 311-2, 311-3, respective concepts may be readily applied for an arbitrary number of narrowband carriers.

In the example of FIG. 7, a primary carrier 311-1 is defined; further, two secondary carriers 311-2, 311-3 are defined. The primary carrier 311-1 may host control functionality with respect to the secondary carriers 311-2, 311-3.

In detail, control messages and control signals are asymmetrically distributed between the primary carrier 311-1, on the one hand side, and the secondary carriers 311-2, 311-3 on the other hand side. In particular, the asymmetric distribution is such that overhead of control signaling is moved from the secondary carriers 311-2, 311-3 to the primary carrier 311-1; such that the secondary carriers 311-2, 311-3 comprise no or a smaller number of control messages and/or control signals. In this context, it is possible that the control messages and control signals communicated on the primary channel 311-1 include information targeted to the secondary carriers 311-2, 311-3. Because of this, the secondary carriers 311-2, 311-3 may offer more resources for the payload channel (not shown in FIG. 7) and may be referred to as "clean channels". The overall data rate of communicating according to the NB-IoT RAT 191 may be further increased, because overhead can be reduced.

In detail, as illustrated in FIG. 7, the primary carrier 311-1 comprises a control channel 403; while the secondary carriers 311-2, 311-3 do not comprise the control channel 403. E.g., the control channel 403 according to the NB-IoT RAT 191 may be comparable to the PDCCH or the PUCCH or the PHICH according to the E-UTRA RAT 192 (all not shown in FIG. 2). The control channel 403 can comprise control messages associated with communicating on, both, on the primary carrier 311-1, as well as on the secondary carriers 311-2, 311-3. E.g., the control messages communicated on the control channel 403 may be selected from the group comprising: DL scheduling assignments identifying resources 308 in the first spectrum 301 for DL communication; UL scheduling grants identifying resources 308 in the first spectrum 301 for UL communication; ARQ acknowledgment messages such as positive acknowledgment messages or negative acknowledgment messages for payload messages communicated on a payload channel of the primary carrier 311-1 or one of the secondary carriers 311-2, 311-3; and RRC control messages. The control channel 403 may be a unicast channel, i.e., targeted specifically to the terminal 130-1.

Further, as illustrated in FIG. 7, the primary carrier 311-1 comprises a broadcast control channel 401 not targeted to a specific terminal; while the secondary carriers 311-2, 311-3 do not comprise the broadcast control channel 401. E.g., the broadcast control channel 401 of the NB-IoT RAT 191 may be comparable to the PBCH according to the E-UTRA RAT 192 (not shown in FIG. 2). The broadcast control channel 401 can comprise control messages associated with communicating on, both, the primary carrier 311-1, as well as on the secondary carriers 311-2, 311-3. E.g., the control messages communicated on the broadcast control channel 401 may correspond to the carrier access system information control messages for accessing the cellular network 100 via the NB-IoT RAT 191. Such control messages may correspond to the E-UTRA RAT MIB or SIB. Example information includes frame numbering, carrier-specific information, and scheduling allocations for random access.

As explained above with respect to the control channels 401, 403, it is possible that information included in a given control message communicated on the control channels 401, 403 on the primary carrier 311-1 is targeted to one of the secondary carriers 311-2, 311-3. I.e., the given control message may be associated with communicating on the primary carrier 311-1 of the plurality of narrowband NB-IoT carriers 311-1, 311-2, 311-3 and/or may be associated with communicating on one or more of the secondary carriers 311-2, 311-3. To facilitate identification of the particular carrier 311-1, 311-2, 311-3 to which the given control message communicated on the control channels 401, 403 is directed, respective indicators can be employed. At the receiver-side, this identification may be used for processing of the information. E.g., the control messages may include indicators indicating the primary carrier 311-1 or one of the secondary carriers 311-2, 311-3. These may be explicit indicators or implicit indicators. E.g., a three bit number may be used. E.g., if the control messages correspond to the E-UTRA RAT 192 MIBs, reserved bits according to 3GPP Technical Specification (TS) 36.331 Rel. 12, Section 6.2.2 could be employed for indicating the primary carrier 311-1 or one of the secondary carriers 311-2, 311-3.

Further, as illustrated in FIG. 7, a temporal density (number per time) of reference signals 402 is larger on the primary carrier 311-1 if compared to the secondary carrier 311-2. Likewise, the temporal density of the reference signals 402 is larger on the secondary carrier 311-2 if compared to the secondary carrier 311-3. The reference signals may facilitate demodulation (demodulation reference signal, DMRS), and/or provide a power reference for communication (sounding reference signal, SRS), or provide cell-specific information for beamforming or support channel estimation (cell-specific reference signal, RS). Also, as illustrated in FIG. 7, synchronization signals 404 are only communicated on the primary carrier 311-1—and are not communicated on the secondary carriers 311-2, 311-3. Such synchronization signals 404 can facilitate temporal acquisition of the timing reference of the eNB 112, 112-1, 112-2 by the terminal 130-2.

Thus, generally speaking, the primary carrier 311-1 may be associated with a first number of control signals 402, 404 per time, while the secondary carrier(s) 311-2, 311-3 may be associated with a second number of control signals 402, 404 per time. The first number may be larger than the second number, e.g., by a factor of 1.2, 1.5, 2, 10, 50, or even larger factors. In some scenarios, it is even possible that control signals 402, 404 are only communicated on the primary carrier 311-1. By using asymmetries with respect to the control signals 402, 404, the amount of overhead can be reduced. This increases the available data rate for communicating according to the NB-IoT RAT 191.

Thus, as can be seen from FIG. 7, in different examples, different implementations of an asymmetric distribution of control messages and/or control signals between the primary carrier 311-1 and the secondary carrier(s) 311-2, 311-3 are conceivable. A further asymmetry between the primary carrier 311-1 and a secondary carrier(s) 311-2, 311-3 may be implemented in terms of the transmit power.

Figure 8A:
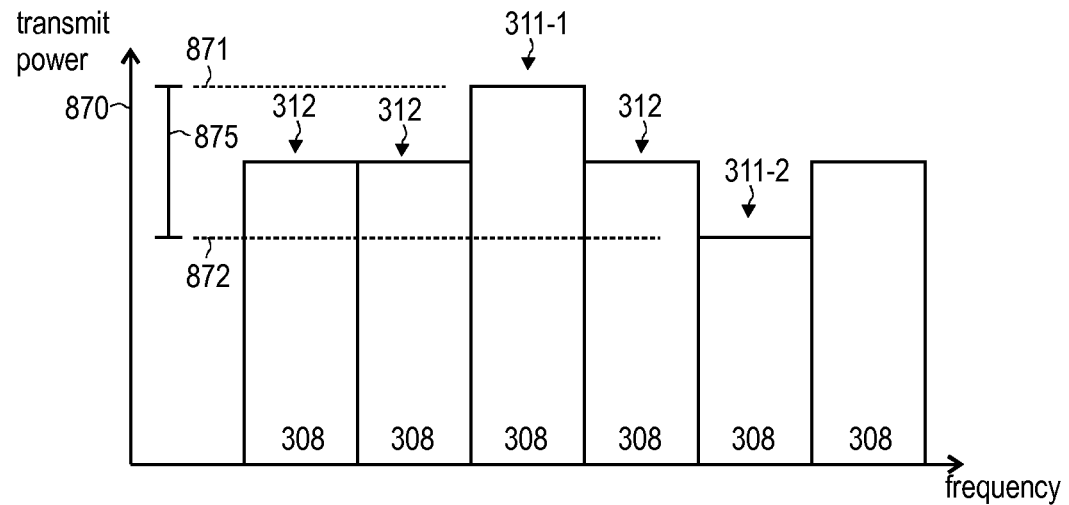
FIG. 8A schematically illustrates an asymmetric transmit power of the plurality of narrowband NB-IoT carriers according to various embodiments.

FIG. 8A illustrates aspects with respect to the transmit power 870. E.g., the transmit power in FIG. 8A may illustrate the power spectral density (PSD). E.g., it is possible that the primary carrier 311-1 is configured to implement a boosted first transmit power 871 if compared to a second transmit power 872 of the secondary carrier(s) 311-2, 311-3, e.g., by a factor 875 of at least 2 dB, preferably of at least 6 dB, more preferably of at least 10 dB.

By implementing an asymmetric transmit power, a likelihood of successful transmission of the control messages and/or the control signals communicated on the primary carrier 311-1 can be increased; thereby, if the control messages and/or the control signals communicated on the primary carrier 311-1 are also relevant for communicating on the secondary carrier(s) 311-2, 311-3, the overall communication reliability of the NB-IoT RAT 191 across all carriers 311, 311-1, 311-2, 311-3 may be increased.

In further examples, the primary carrier 311-1 may be configured to implement a boosted first transmit power 871 if compared to the average transmit power of all resources 308, e.g., of the NB-IoT RAT 191 and/or the E-UTRA RAT 192.

Above, examples have been given for asymmetries with respect to the transmit power and the at least one of the control messages and the control signals. Further asymmetries which may be implemented alternatively or additionally may relate to the bundled transmission sets 351 comprising a plurality of repetitions of the same redundancy version of data. E.g., the temporal arrangement and/or the number of the subframes of a bundled transmission set 351 may be asymmetrically distributed across the different narrowband NB-IoT carriers 311-1, 311-2, 311-3. E.g., the primary carrier 311-1 may carry more repetitions of the bundled transmission set 351 if compared to the secondary carrier(s) 311-2, 311-3 (cf. FIG. 6). E.g., the primary carrier 311-1 may commence earlier with communication of repetitions of the bundled transmission set 351 if compared to the secondary carrier(s) 311-2, 311-3 (cf. FIG. 6).

Implementation of such asymmetries, e.g., with respect to the transmit power and/or the at least one of the control messages and the control signals and/or the bundled transmission set 351, may be facilitated by the comparably small total bandwidth of the first spectrum 301 of the narrowband NB-IoT carriers 301, 301-1, 301-2, 301-3 of the NB-IoT RAT 191 and/or by the comparably small bandwidth of each one of the narrowband NB-IoT carriers 301, 301-1, 301-2, 301-3. E.g., where the distance in frequency space between the primary carrier 311-1 and the secondary carrier(s) 311-2, 311-3 is comparably small (which is possible due to the small bandwidth of each individual carrier 311-1, 311-2, 311-3), reference signals communicated on the primary carrier 311-1 may be of significance for the secondary carrier(s) 311-2, 311-3. This may, in particular, apply for in-band contiguous deployment scenarios (cf. FIG. 4). Also, where the bandwidth of each individual carrier 311-1, 311-2, 311-3 is small, the number of reference signals required per carrier may be comparably low. Furthermore, where individual secondary carriers 311-2, 311-3 cannot operate stand-alone, i.e., without an accompanying primary carrier 311-1, it is feasible to communicate the synchronization control signals 404 only on the primary carrier 311-1; in such a scenario, it is possible that the TTIs—e.g., frames or subframes—are synchronized between the primary carrier 311-1 and the secondary carrier(s) 311-2, 311-3. Cross-carrier scheduling is facilitated by using the control channel 403 comprising scheduling control messages only in the primary carrier 311-1. Frequency hopping can be employed.

Figure 8B:
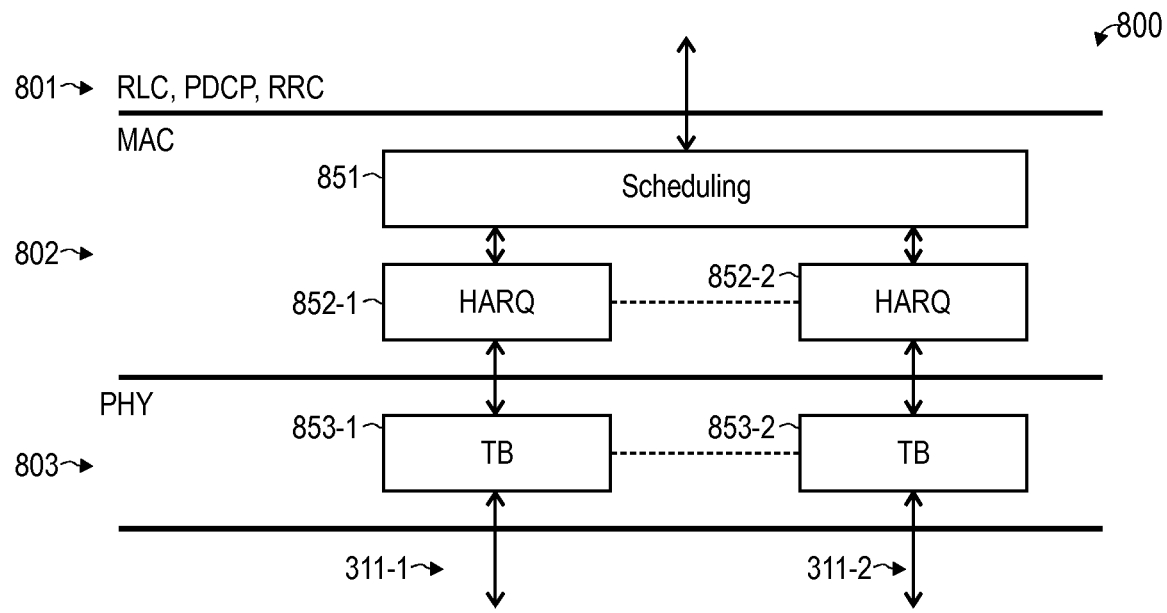
FIG. 8B schematically illustrates aggregating messages communicated on the plurality of narrowband carriers at a Medium Access Layer of a communication protocol stack of the NB-IoT RAT according to which the plurality of narrowband NB-IoT carriers are operating according to various embodiments.

FIG. 8B illustrates a communication protocol stack 800 of the NB-IoT RAT 191. In particular, FIG. 8B illustrates aspects of a CA scenario. As can be seen, in the CA scenario of FIG. 8B, separate physical layers 803 of the communication protocol stack 800 are implemented for each one of the plurality of narrowband NB-IoT carriers 311-1, 311-2. I.e., where a larger (smaller) number of NB-IoT carriers is used, a larger (smaller) number of co-existing instances of the physical layers 803 are implemented.

Aggregation of payload messages communicated on the payload channels of each carrier 311-1, 311-2 is implemented at an upper edge of the Medium Access Layer (MAC) 802 of the communication protocol stack 800. Further upper layers include: Radio Link Control (RLC) layer, Packet Data Convergence Protocol (PDCP) layer, and RRC layer.

In other CA scenarios, aggregation may be implemented at other levels of the communication protocol stack 800, e.g., somewhere within the physical layer 803 or closer to the lower edge of the MAC layer 802. In particular, in the scenario of FIG. 8B, the Hybrid ARQ (HARQ) protocol—comprising ARQ protocol functionality and Forward Error Correction (FEC) functionality—is implemented by each corresponding sublayer 852-1, 852-2 independently for each carrier 311-1, 311-2; in other examples, CA may be implemented using a single HARQ instance, only.

FIG. 8B further illustrates aspects with respect to a Transport Block (TB) sublayer 853-1, 853-2 of the physical layer 803. The TB sublayer 853-1, 853-2 assembles higher-layer data packets, e.g., MAC Packet Data Units (PDUs), into TBs which are mapped to the subframes 309. Here, depending on the MCS, a different number of bits can be included in each TB (bit loading).

In some examples, it is possible that the sublayers 853-1, 853-2 of the two carriers 311-1, 311-2 operate independently of each other. Then, bit loading may be chosen independently for the TBs of each carrier 311-1, 311-2.

In other examples (as illustrated in FIG. 8B by the horizontal dashed line) it is possible that coordination exists in between the sublayers 853-1, 853-2 of the two carriers 311-1, 311-2. E.g., it is possible that such coordination implements using TBs of the same size, i.e., including the same number of bits, on the different carriers 311-1, 311-2 for time-overlapping subframes 309 of the different carriers 311-1, 311-2. E.g., if the TTIs of the different carriers 311-1, 311-2 are synchronized, then at the same moment in time the same size of TBs may be employed across the different carriers 311-1, 311-2. Thus, bit loading may be synchronized across the narrowband NB-IoT carriers 311-1, 311-2. E.g., where TBs of the same size are employed, it may be preferable to additionally include coordination between the HARQ processes 852-1, 852-2 (as illustrated in FIG. 8B by the horizontal dashed line). In some examples, one and the same HARQ process may be employed for all carriers 311-1, 311-2 or bonding may be below the HARQ process.

In some examples, the bit loading may be optimized across all carriers 311-1, 311-2, 311-3 of the NB-IoT RAT 191. In further examples, the bit loading may be selectively optimized with respect to the primary carrier 311-1. In particular, it is possible that the number of bits of the TBs is based on a frequency-selective measurement 360 (cf. FIGS. 4-6) which is indicative of the quality of said communicating on the primary carrier 311-1.

Such measurement may include elements selected from the group comprising: a number of positive acknowledgment messages of the HARQ protocol associated with payload messages communicated on the primary carrier 311-1; a number of negative acknowledgment messages of the HARQ protocol associated with payload messages communicated on the primary carrier 311-1; a channel quality indicator (CQI) of communication on the primary carrier 311-1; etc.

Due to the small overall bandwidth of the first spectrum 301 of the NB-IoT RAT 191, the measurement 360 taken for the primary carrier 311-1 may be of significance for communicating on the secondary carrier(s) 311-2, 311-3, as well.

By re-using the measurement 360 taken for the primary carrier 311-1 for the secondary carrier(s) 311-2, 311-3, a system complexity can be reduced and, furthermore, a need of control signaling, e.g., of a CQI report, on the secondary carrier(s) 311-2, 311-3 may be reduced. The control signaling overhead is reduced; thereby, the data rate can be increased.

With respect to the preceding FIGS. 4-8B, examples have been disclosed where the first spectrum 301 of the narrowband NB-IoT carrier(s) 311, 311-1, 311-2, 311-3 is non-overlapping with the second spectrum 302 of the wideband LTE carrier 312. Hence, the first spectrum 301 is dedicated to the NB-IoT carrier(s) 311, 311-1, 311-2, 311-3; the first spectrum 301 and the second spectrum 302 may not comprise a shared spectrum. Here, an increase in the available data rate is rather achieved by using a plurality of narrowband NB-IoT carriers 311-1, 311-2, 311-3, e.g. according to a CA implementation. Additional resources 308 are dedicated to the narrowband NB-IoT carriers 311-1, 311-2, 311-3.

Such a dedication of resources 308 to the narrowband NB-IoT RAT 191 may be comparably static. Thus, during operation, it may not be possible or only possible to a limited degree to fine-tune distribution of resources 308 between the RATs 191, 192, e.g., on a short time scale. Such fine tuning may be desirable where, e.g., the traffic of data communicated according to the NB-IoT RAT 191 changes. Hereinafter, techniques are disclosed which enable to fine-tune distribution of resources 308 between the RATs 191, 192. These techniques rely on employing the shared spectrum. Such techniques can be combined with techniques disclosed above relying on a plurality of narrowband NB-IoT carriers.

Figure 9:
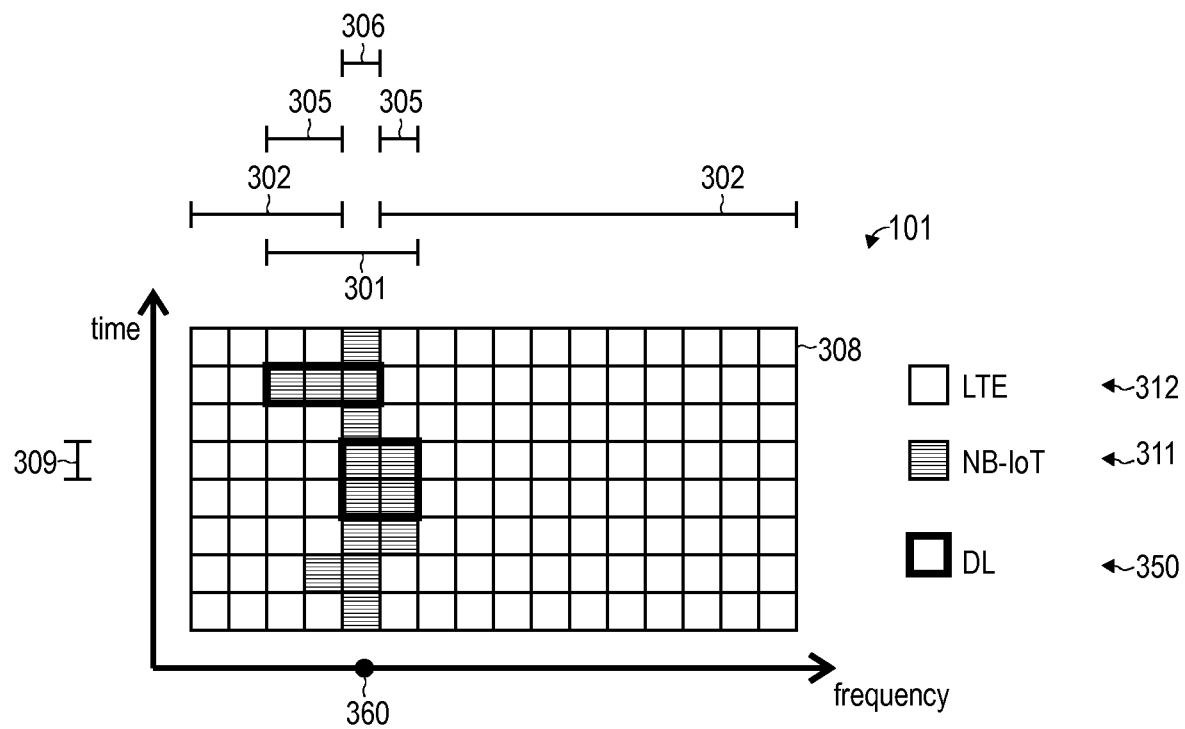
FIG. 9 illustrates resources on a radio link according to various embodiments, wherein FIG. 9 schematically illustrates a scenario where the first spectrum of at least one narrowband NB-IoT carrier as well as the second spectrum of the wideband LTE carrier, both, comprise a shared spectrum.

FIG. 9 illustrates aspects with respect to employing a shared spectrum 305. As can be seen from FIG. 9, both, the first spectrum 301 of the narrowband NB-IoT carrier 311, as well as the second spectrum 302 of the wideband LTE carrier 312 comprise the shared spectrum 305. The shared spectrum 305 is arranged adjacent to a dedicated spectrum 306 which is occupied only by the narrowband NB-IoT carrier 311.

Resources 308 of the shared spectrum 305 are allocated as-needed to, either, communication according to the NB-IoT RAT 192 or according to the E-UTRA RAT 312. E.g., as can be seen from FIG. 9, first resources 308 in the shared spectrum are allocated to the narrowband NB-IoT carrier 311; while second resources 308 in the shared spectrum 305 are allocated to the wideband LTE carrier 312. This allocation occurs in a TDM manner such that the first and second resources 308 allocated to the different carriers 311, 312 are orthogonal to each other; thereby, interference between the NB-IoT RAT 191 and the E-UTRA RAT 192 can be mitigated.

A central scheduling process common to the RATs 191, 192 may be implemented. The central scheduling process may facilitate interference mitigation on the shared spectrum 305 by implementing the TDM scheduling. This may include control signaling between non-colocated access nodes 112-1, 112-2 (cf. FIG. 1).

A scheduling control message including an indicator indicating the first resources 308 can be communicated on a control channel of the narrowband NB-IoT carrier 311 (not shown in FIG. 9). E.g., RRC control signaling may be employed. This informs the terminal 130-1 on the resources 308 it is allowed to use on the shared spectrum 305. A further scheduling control message including an indicator indicating the second resources 308 can be communicated on a control channel of the wideband LTE carrier 312 (not shown in FIG. 9). E.g., the PDCCH can be employed. RRC control signaling may be employed. This informs the terminal 130-2 on the resources 308 it is allowed to use on the shared spectrum 305.

Because the shared spectrum 305 extends beyond the dedicated spectrum 306 of the first spectrum 301 which is not shared with the second spectrum 302, the first terminal 130-1 is required to support communication in a broader frequency band. In order to ensure that the first terminal 130-1 is capable of communicating on frequencies of the shared spectrum 305, a capability control message may be communicated on a control channel of the at least one NB-1OT carrier 311, the capability control message including an indicator indicating a capability of the first terminal 130-1 to communicate in the shared spectrum 305 (the capability control message is not shown in FIG. 9).

As disclosed above with respect to FIG. 8B, it is possible to rely on measurements 360 indicative of the quality of communicating on the narrowband carrier 311 in the dedicated spectrum 306 when determining the MCS for resources 308 located in the shared spectrum 305. As such, TBs communicated in the shared spectrum 305 and in the dedicated spectrum 306 in time-overlapping subframes 309 may all include the same number of bits. Techniques disclosed above for the example of FIG. 8B may also be applied for scenarios relying on the shared spectrum 305.

It is possible to apply the concepts as illustrated above with respect to a co-deployment scenario of the NB-IoT RAT 191 and the E-UTRA RAT 192 to a co-deployment scenario including other RATs, alternatively or additionally. An example of another RAT is the MTC RAT.

Figure 10:
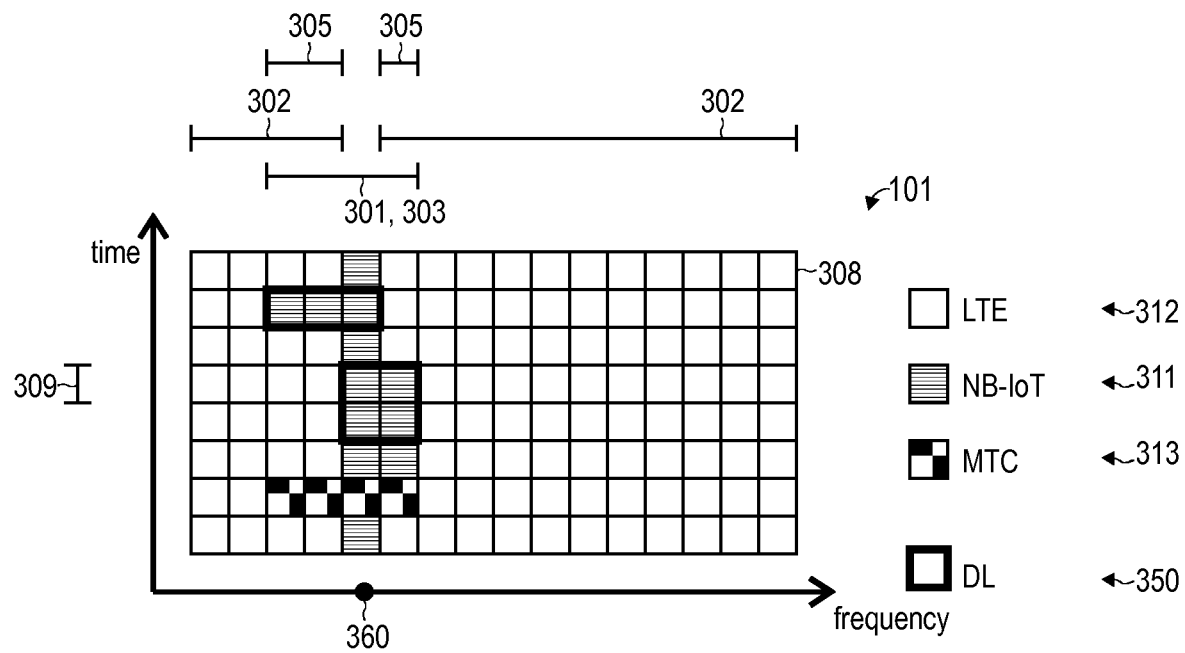
FIG. 10 illustrates resources on a radio link according to various embodiments, wherein FIG. 10 schematically illustrates a scenario where the first spectrum of at least one narrowband NB-IoT carrier, as well as a second spectrum of a wideband LTE carrier, as well as a third spectrum of a wideband MTC carrier all comprise a shared spectrum.

FIG. 10 illustrates aspects with respect to employing a shared spectrum 305. Here, the shared spectrum 305 is part of a first spectrum 301 of the narrowband NB-IoT carrier 311, is further part of a second spectrum 302 of the wideband LTE carrier 312, and is still further part of a third spectrum 303 of a the wideband MTC carrier 313.

Scenarios of employing the shared spectrum 305 as illustrated above with respect to FIGS. 9 and 10 may be readily combined with scenarios using a plurality of narrowband NB-IoT carriers 311-1, 311-2, 311-3 as illustrated above with respect to FIGS. 4-8B.

Figure 11:
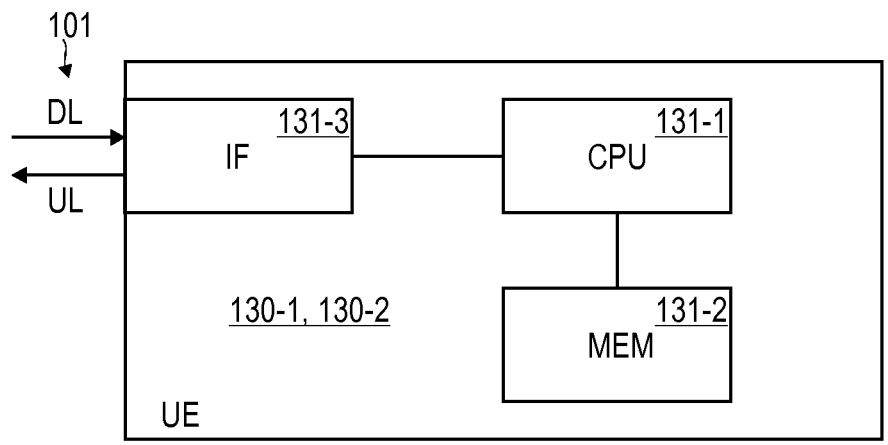
FIG. 11 is a schematic illustration of a terminal according to various embodiments.

FIG. 11 schematically illustrates the terminals 130-1, 130-2, e.g., an IoT device. The terminal comprises a processor 131-1, e.g., a single core or multicore processor. Distributing processing may be employed. The processor 131-1 is coupled to a memory 131-2, e.g., a non-volatile memory. The memory 131-2 may store program code that is executable by the processor 131-1. Executing the program code may cause the processor 131-1 to perform techniques as disclosed herein, e.g., relating to: communicating on one or more narrowband NB-IoT carriers 311, 311-1, 311-2, 311-2 and/or communicating on one or more wideband LTE carriers 312 or wideband MTC carriers 313. The interface 131-3 may comprise an analog front end and/or digital front end. The interface 131-3 may implement a communication protocol stack 800, e.g., according to the 3GPP E-UTRA RAT 191 and/or according to the 3GPP NB-IoT RAT 191. The communication protocol stack 800 may comprise a physical layer, the MAC layer, etc.

Figure 12:
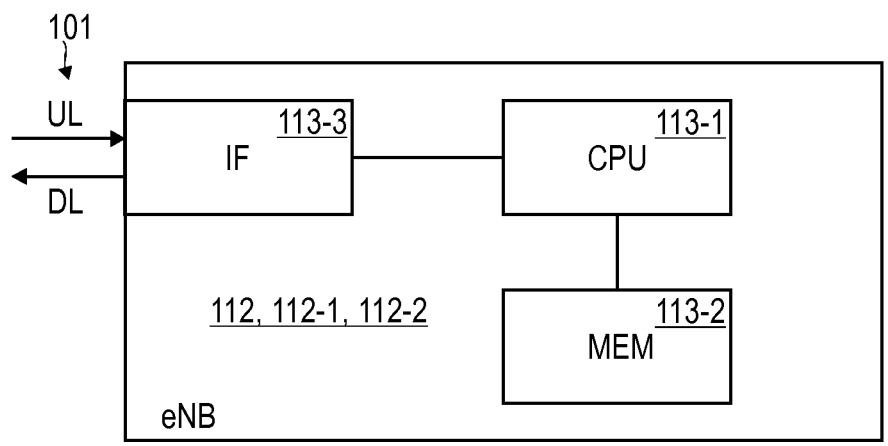
FIG. 12 is a schematic illustration of an access node according to various embodiments.

FIG. 12 schematically illustrates the eNB 112, 112-1, 112-2. The eNB 112, 112-1, 112-2 comprises a processor 113-1, e.g., a single core or multicore processor. Distributing processing may be employed. The processor 113-1 is coupled to a memory 113-2, e.g., a non-volatile memory. The memory 113-2 may store program code that is executable by the processor 113-1. Executing the program code can cause the processor 113-1 to perform techniques as disclosed herein, e.g., relating to: communicating on one or more narrowband NB-IoT carriers 311, 311-1, 311-2, 311-2 and/or communicating on one or more wideband LTE carriers 312 or wideband MTC carriers 313; allocating resources in the shared spectrum 305 to the narrowband NB-IoT carrier(s) 311, 311-1, 311-2, 311-2 or to the one or more wideband LTE carriers 312 or wideband MTC carriers 313. The eNB 112, 112-1, 112-2 also comprises an interface 113-3 configured to communicate with the terminal 130-1, 130-2 on the radio link 101. The interface 113-3 may comprise an analog front end and/or a digital front end. The interface 113-3 may implement a communication protocol stack 800, e.g., according to the 3GPP E-UTRA RAT 191 and/or according to the 3GPP NB-IoT RAT 191. The communication protocol stack 800 may comprise a physical layer, the MAC layer, etc.

Figure 13:
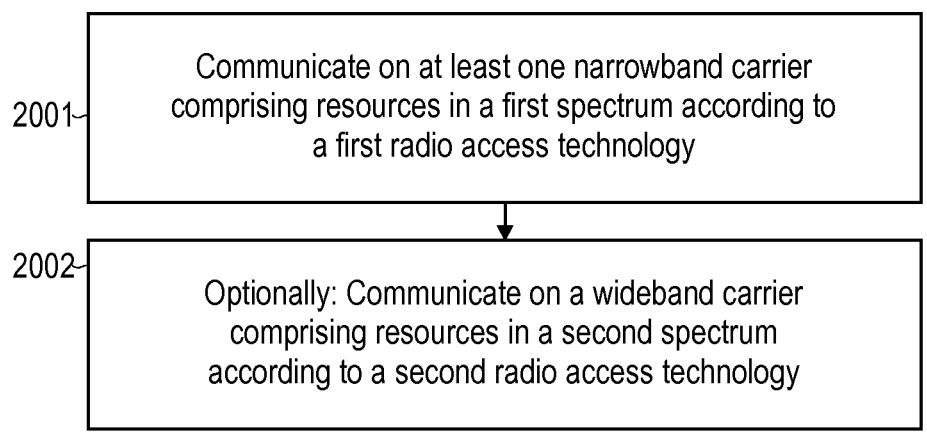
FIG. 13 is a flowchart of a method according to various embodiments.

FIG. 13 is a flowchart of a method according to various embodiments. First, at 2001, communication on at least one narrowband carrier such as the NB-IoT carrier(s) 311, 311-1, 311-2, 311-3 is executed. E.g., 2001 may be executed by the terminal 130-1 and/or the access node 112, 112-1. Communicating may comprise sending and/or receiving.

Communication may be executed on a plurality of narrowband carriers, e.g., employing CA. As such, the method may further comprise: aggregating payload messages communicated on a payload channel of the plurality of narrowband carriers at the MAC layer 802. In other examples, aggregation can occur at different positions within the communication protocol stack 800, e.g., at an upper edge of the physical layer 803. Said aggregating may correspond to bonding the various narrowband carriers.

The at least one narrowband carrier comprises resources 308 in a first spectrum 301 and operates according to a first RAT, e.g., according to the NB-IoT RAT 191. The first spectrum 301 is arranged at least partly within a second spectrum 302.

Optionally, at 2002, communication on a wideband carrier such as the wideband LTE carrier 312 and/or the wideband MTC carrier 313 is executed. The wideband carrier comprises resources 308 in the second spectrum 302.

In some examples, both, the first and second spectra 301, 302 comprise a shared spectrum 305. In such a case, it is possible that the method optionally further includes: allocating first resources 308 in the shared spectrum 305 to the at least one narrowband carrier; and allocating second resources 308 in the shared spectrum 305 to the wideband carrier. Here, central scheduling across both RATs associated with the narrowband and wideband carriers can be implemented. A respective scheduling control message may be communicated as part of the method which indicates the first resources and/or the second resources.

In some examples, the communicating at 2001 and 2002 may occur in a coordinated fashion, i.e., in a co-deployment scenario. For this, control signaling between respective access nodes may be implemented; it is also possible, that the respective access nodes are statically configured such that coordination according to the co-deployment scenario is achieved.

Summarizing, above techniques of flexible resource allocation when communicating on a narrowband carrier or a plurality of narrowband carriers have been illustrated. The techniques rely on communicating on a plurality of narrowband carriers and/or communicating on a shared spectrum shared between the at least one narrowband carrier and one or more wideband carriers.

By the techniques disclosed above, it is possible to flexibly increase or tailor the data rate of communication according to a RAT associated with the at least one narrowband carrier.

Further, by the techniques disclosed above, it is possible to reduce a latency of data transmission, e.g., in a scenario where bundled transmission sets are employed which carry the same redundancy version of encoded data in subsequent TTIs.

In particular, in some examples, the techniques disclosed herein may be applied for communication according to the NB-IoT RAT. By flexibly increasing the data rate achievable by the NB-IoT RAT, a gap between the MTC RAT and the NB-IoT technology can be bridged. Flexible resource allocation becomes possible for operators targeting NB-IoT deployments, as well as supporting use case flexibility between the NB-IoT RAT on the one hand side, and the MTC RAT or the E-UTRA RAT, on the other hand side.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while above primarily examples have been given with respect to a co-deployment scenario of NB-IoT RAT and E-UTRA RAT, in other examples other RATs may be co-deployed, e.g. NB-IoT RAT and MTC RAT. Also, a larger number of RATs may be co-deployed, e.g., NB-IoT RAT, MTC RAT, and E-UTRA RAT.

E.g., while above examples have been primarily disclosed which rely on, either, a plurality of narrowband carriers, or a shared spectrum, in other examples concepts of employing a plurality of narrowband carriers may be readily combined with concepts employing a shared spectrum.

E.g., while above various examples have been primarily given with respect to communicating on the at least one narrowband carrier according to the first RAT, in other examples additionally communication on the one or more wideband carriers according to the second RAT may be subject to embodiments.

E.g., while above various examples have been given with respect to DL communication between a terminal and a cellular network, in other examples respective techniques may be readily applied to UL communication.

E.g., while above various examples have been disclosed in the context of employing a bundled transmission set where a plurality of repetitions of a data packet encoded according to a given redundancy version is communicated on the at least one narrowband carrier, in other examples such a repeated communication of the same redundancy version is not required to be implemented for communication on the at least one narrowband carrier. E.g., in further examples, instead of communicating a plurality of repetitions, the transmit power may be increased.

The invention claimed is:

1. A method, comprising:
communicating, between at least one access node of a wireless network and a first terminal attached to the wireless network, on a plurality of narrowband carriers, the plurality of narrowband carriers comprising resources in a first spectrum and operating according to a first radio access technology,
wherein the first spectrum is arranged at least partly within a second spectrum on which communication between the at least one access node and a second terminal is executed on a wideband carrier, the wideband carrier comprising resources in the second spectrum and operating according to a second radio access technology different to the first radio access technology,
wherein the first spectrum and the second spectrum both comprise a shared spectrum, and
wherein the resources in the shared spectrum are flexibly allocated to either the plurality of narrowband carriers or to the wideband carrier using central scheduling across the first radio access technology and the second radio access technology such that a data rate for communicating according to the first radio access technology is flexibly adjusted.

2. The method of claim 1, further comprising:
communicating control messages and control signals on the plurality of narrowband carriers,
wherein at least one of the control messages and the control signals are asymmetrically distributed between the plurality of narrowband carriers.

3. The method of claim 1,
wherein a primary carrier of the plurality of narrowband carriers comprises a payload channel and a control channel,
wherein a secondary carrier of the plurality of narrowband carriers comprises the payload channel and does not comprise the control channel.

4. The method of claim 3, further comprising:
aggregating payload messages communicated on the payload channel at a Medium Access Layer of a communication protocol stack of the first radio access technology.

5. The method of claim 3,
wherein the control channel comprises control messages associated with said communicating on the primary carrier of the plurality of narrowband carriers and associated with said communicating on the secondary carrier of the plurality of narrowband carriers,
wherein the control messages are preferably selected from the group comprising: downlink scheduling assignments identifying resources for downlink communication; uplink scheduling grants identifying resources for uplink communication; Automatic Repeat Request acknowledgement messages; and carrier access system information.

6. The method of claim 5,
wherein the control messages include indicators indicating the primary carrier of the plurality of the plurality of narrowband carriers or the secondary carrier of the plurality of narrowband carriers.

7. The method of claim 1,
wherein a primary carrier of the plurality of narrowband carriers is associated with a first transmit power,
wherein a secondary carrier of the plurality of narrowband carriers is associated with a second transmit power,
wherein the first transmit power is larger than the second transmit power.

8. The method of claim 1,
wherein a primary carrier of the plurality of narrowband carriers is associated with a first number of control signals per time, wherein a secondary carrier of the plurality of narrowband carriers is associated with a second number of control signals per time,
wherein the first number of control signals per time is larger than the second number of control signals per time, wherein the control signals are preferably selected from the group comprising: channel reference signals; and time synchronization signals.

9. The method of claim 1, further comprising:
communicating, on the plurality of narrowband carriers, using transport blocks mapped to fixed transmission intervals,
wherein the transport blocks communicated on the plurality of narrowband carriers in time-overlapping transmission intervals all include the same number of bits.

10. The method of claim 9, further comprising:
for the time-overlapping transmission intervals: determining the number of bits of the transport blocks based on a frequency-selective measurement indicative of a quality of said communicating on a primary carrier of the plurality of narrowband carriers.

11. The method of claim 1,
communicating a first plurality of repetitions of a data packet encoded according to a given redundancy version on a primary carrier of the plurality of narrowband carriers,
communicating a second plurality of repetitions of the data packet encoded according to the given redundancy version on a secondary carrier of the plurality of narrowband carriers.

12. The method of claim 11,
wherein the first plurality of repetitions and the second plurality of repetitions are part of a bundled transmission set.

13. The method of claim 1, wherein a single Hybrid Automatic Repeat Request process is employed for all narrowband carriers of the plurality of narrowband carriers, and
wherein the method further comprises:
aggregating payload messages communicated on a payload channel of the plurality of narrowband carriers at a physical layer.

14. A method, comprising:
communicating, between at least one access node of a wireless network and a first terminal attached to the wireless network, on at least one narrowband carrier, the at least one narrowband carrier comprising time-frequency resources in a first spectrum and operating according to a first radio access technology,
wherein the first spectrum is arranged at least partly within a second spectrum on which communication between the at least one access node and a second terminal is executed on a wideband carrier, the wideband carrier comprising time-frequency resources in the second spectrum and operating according to a second radio access technology different to the first radio access technology,
wherein the first spectrum and the second spectrum both comprise a shared spectrum,
wherein a duration of a time-frequency resource corresponds to a duration of a fixed transmission interval,
wherein the first spectrum comprises the shared spectrum and a dedicated spectrum not shared with the wideband carrier, and
wherein the method further comprises:
communicating, on the at least one narrowband carrier, using transport blocks mapped to fixed transmission intervals, the transport blocks communicated in the shared spectrum and in the dedicated spectrum in time-overlapping transmission intervals all including the same number of bits.

15. The method of claim 14, further comprising:
allocating first resources in the shared spectrum to the at least one narrowband carrier,
allocating second resources in the shared spectrum to the wideband carrier,
wherein the first resources are orthogonal to the second resources.

16. The method of claim 15, further comprising:
communicating a scheduling control message on a control channel of the at least one narrowband carrier, the scheduling control message including an indicator indicating the first resources.

17. The method of claim 14, further comprising:
communicating a capability control message on a control channel of the at least one narrowband carrier, the capability control message including an indicator indicating a capability the first terminal to communicate in the shared spectrum.

18. The method of claim 14, further comprising:
for the time-overlapping transmission intervals: determining the number of bits of the transport blocks based on a frequency-selective measurement indicative of a quality of said communicating on the at least one narrowband carrier in the dedicated spectrum.

19. An access node of a wireless network, comprising:
an interface configured to wirelessly transceive on a radio link,
at least one processor configured to communicate, via the interface, with a terminal attached to the wireless network on a plurality of narrowband carriers, the plurality of narrowband carriers comprising resources in a first spectrum and operating according to a first radio access technology,
wherein the first spectrum is arranged at least partly within a second spectrum on which communication between the at least one access node and a second terminal is executed on a wideband carrier, the wideband carrier comprising resources in the second spectrum and operating according to a second radio access technology different to the first radio access technology,
wherein the first spectrum and the second spectrum both comprise a shared spectrum, and
wherein the resources in the shared spectrum are flexibly allocated to either the plurality of narrowband carriers or to the wideband carrier using central scheduling across the first radio access technology and the second radio access technology such that a data rate for communicating according to the first radio access technology is flexibly adjusted.

20. An access node of a wireless network, comprising:
an interface configured to wirelessly transceive on a radio link,
at least one processor configured to communicate, via the interface, with a terminal attached to the wireless network on at least one narrowband carrier, the at least one narrowband carrier comprising resources in a first spectrum and operating according to a first radio access technology,
wherein the first spectrum is arranged at least partly in a second spectrum on which communication between the at least one access node and a second terminal is executed on a wideband carrier, the wideband carrier comprising resources in the second spectrum and operating according to a second radio access technology different to the first radio access technology, wherein the first spectrum and the second spectrum both comprise a shared spectrum, wherein a duration of a time-frequency resource corresponds to a duration of a fixed transmission interval, wherein the first spectrum comprises the shared spectrum and a dedicated spectrum not shared with the wideband carrier, and wherein the at least one processor is further configured to:

communicate, on the at least one narrowband carrier, using transport blocks mapped to fixed transmission intervals, the transport blocks communicated in the shared spectrum and in the dedicated spectrum in time-overlapping transmission intervals all including the same number of bits.

* * * * *